US007566274B2

(12) United States Patent
Johnson et al.

(10) Patent No.: US 7,566,274 B2

(45) Date of Patent: Jul. 28, 2009

(54) VIDEO TABLE GAME APPARATUS, SYSTEM, AND METHOD OF USE

(75) Inventors: Bradley W. Johnson, Las Vegas, NV (US); Vaughn D. Place, Las Vegas, NV (US); Andrew Trzeciak, Algonquin, IL (US)

(73) Assignee: Paltronics, Inc., Las Vegas, NV (US)

(*) Notice: Subject to any disclaimer, the term of this patent is extended or adjusted under 35 U.S.C. 154(b) by 0 days.

(21) Appl. No.: 10/026,289

(22) Filed: Dec. 19, 2001

(65) Prior Publication Data

US 2002/0077170 A1 Jun. 20, 2002

Related U.S. Application Data

(60) Provisional application No. 60/326,434, filed on Oct. 1, 2001, provisional application No. 60/256,363, filed on Dec. 19, 2000.

(51) Int. Cl.
*A63F 13/00* (2006.01)

(52) U.S. Cl. ........................................ 463/42; 273/309

(58) Field of Classification Search ..................... 463/1, 463/16–25, 30–31, 36, 40–42, 29; 273/148 R, 273/309, 138.1, 139, 292, 274
See application file for complete search history.

(56) References Cited

U.S. PATENT DOCUMENTS

| | | | | |
|---|---|---|---|---|
| 4,339,798 | A | 7/1982 | Hedges et al. | |
| 4,467,424 | A | 8/1984 | Hedges et al. | |
| 4,643,425 | A | 2/1987 | Herzenberger | |
| 4,725,977 | A * | 2/1988 | Izumi et al. | 711/115 |
| 4,856,787 | A * | 8/1989 | Itkis | 273/237 |
| 4,926,327 | A | 5/1990 | Sidley | |
| 5,116,055 | A | 5/1992 | Tracy | |
| 5,249,800 | A | 10/1993 | Hilgendorf et al. | |
| 5,259,613 | A * | 11/1993 | Marnell, II | 463/42 |
| 5,280,909 | A | 1/1994 | Tracy | |
| 5,288,077 | A | 2/1994 | Jones | |
| 5,326,104 | A * | 7/1994 | Pease et al. | 463/18 |

(Continued)

FOREIGN PATENT DOCUMENTS

WO WO 99/42186 8/1999

OTHER PUBLICATIONS

John Huxley,Live table gaming has just changed for finity, Product information,John Huxley Casino Equipment Ltd., London, England.

(Continued)

*Primary Examiner*—Scott E Jones

(57) ABSTRACT

Disclosed are stand-alone and networked game table video or entertainment system for use in conjunction with a primary or underlying table game. The system includes a video display, and table interface device, and a player input device associated with one or more game tables. The video display, table interface device, and player interface device communicate via a computer, which cooperatively provide video, audio, text, or images on the video display and provide the game player with the opportunity to play a side wager or secondary game of chance at the game table. The system may be used to also provide other types of video content, such as attract mode video, conventional TV or cable channels, audio entertainment, and text or image banner information or advertisements.

20 Claims, 26 Drawing Sheets

U.S. PATENT DOCUMENTS

| | | | | | |
|---|---|---|---|---|---|
| 5,377,973 | A | * | 1/1995 | Jones et al. | 463/12 |
| 5,382,025 | A | | 1/1995 | Sklansky et al. | |
| 5,393,067 | A | * | 2/1995 | Paulsen et al. | 273/292 |
| 5,417,430 | A | * | 5/1995 | Breeding | 273/292 |
| 5,472,194 | A | * | 12/1995 | Breeding et al. | 463/27 |
| 5,476,259 | A | * | 12/1995 | Weingardt | 463/28 |
| 5,564,701 | A | * | 10/1996 | Dettor | 463/16 |
| 5,570,885 | A | * | 11/1996 | Ornstein | 463/27 |
| 5,611,730 | A | | 3/1997 | Weiss | |
| 5,707,285 | A | | 1/1998 | Place et al. | |
| 5,741,183 | A | | 4/1998 | Acres et al. | |
| 5,743,800 | A | * | 4/1998 | Huard et al. | 463/26 |
| 5,762,552 | A | | 6/1998 | Vuong et al. | |
| 5,770,533 | A | * | 6/1998 | Franchi | 463/42 |
| 5,788,573 | A | | 8/1998 | Baerlocher et al. | |
| 5,794,964 | A | | 8/1998 | Jones et al. | |
| 5,795,225 | A | | 8/1998 | Jones et al. | |
| 5,830,069 | A | | 11/1998 | Soltesz et al. | |
| 5,848,932 | A | | 12/1998 | Adams | |
| 5,876,284 | A | | 3/1999 | Acres et al. | |
| 5,882,261 | A | | 3/1999 | Adams | |
| 5,911,418 | A | | 6/1999 | Adams | |
| 5,911,626 | A | | 6/1999 | McCrea, Jr. | |
| 5,913,726 | A | | 6/1999 | Jones et al. | |
| 5,934,999 | A | | 8/1999 | Valdez | |
| 5,951,011 | A | | 9/1999 | Potter et al. | |
| 6,004,207 | A | | 12/1999 | Wilson, Jr. et al. | |
| 6,012,982 | A | | 1/2000 | Piechowiak et al. | |
| 6,015,347 | A | * | 1/2000 | Maahs et al. | 463/27 |
| 6,024,642 | A | | 2/2000 | Stupak | |
| 6,080,063 | A | | 6/2000 | Khosla | |
| 6,083,105 | A | | 7/2000 | Ronin et al. | |
| 6,093,101 | A | * | 7/2000 | Mourad | 463/13 |
| 6,123,335 | A | * | 9/2000 | Adkins | 273/292 |
| 6,146,270 | A | * | 11/2000 | Huard et al. | 463/12 |
| 6,146,646 | A | * | 11/2000 | Yusuf | 424/401 |
| 6,165,069 | A | * | 12/2000 | Sines et al. | 463/12 |
| 6,217,448 | B1 | | 4/2001 | Olsen | |
| 6,224,484 | B1 | | 5/2001 | Okuda et al. | |
| 6,267,669 | B1 | | 7/2001 | Luciano, Jr. et al. | |
| 6,270,410 | B1 | * | 8/2001 | DeMar et al. | 463/20 |
| 6,302,395 | B1 | | 10/2001 | Astaneha | |
| 6,336,857 | B1 | * | 1/2002 | McBride | 463/12 |
| 6,346,044 | B1 | * | 2/2002 | McCrea, Jr. | 463/27 |
| 6,379,247 | B1 | * | 4/2002 | Walker et al. | 463/25 |
| 6,485,368 | B2 | * | 11/2002 | Jones et al. | 463/13 |
| 6,517,073 | B1 | * | 2/2003 | Vancura | 273/274 |
| 6,585,586 | B1 | * | 7/2003 | Romero | 463/12 |
| 6,638,167 | B1 | * | 10/2003 | Sawyer et al. | 463/26 |
| 6,641,483 | B1 | * | 11/2003 | Luciano et al. | 463/46 |
| 6,769,693 | B2 | * | 8/2004 | Huard et al. | 273/274 |
| 6,848,994 | B1 | * | 2/2005 | Knust et al. | 463/25 |
| 2001/0036864 | A1 | | 11/2001 | Melas | |
| 2003/0137110 | A1 | * | 7/2003 | Huard et al. | 273/292 |
| 2003/0232651 | A1 | * | 12/2003 | Huard et al. | 463/42 |

OTHER PUBLICATIONS

John Huxley,infinity, What is Infinity, Product information,John Huxley Casino Equipment Ltd., London, England.

John Huxley,Technology To The Rescue, Product information,Internatioanl Gaming & Wagering Business.

John Huxley,Live table gaming has just changed for finity, Product information,John Huxley Casino Equipment Ltd., London, England, 1998.

John Huxley,infinity, What is Infinity, Product information,John Huxley Casino Equipment Ltd., London, England, Feb. 2000.

John Huxley,Technology To The Rescue, Product information,International Gaming & Wagering Business , 1999.

* cited by examiner

System Diagram

Video Table System Diagram

Table Input Device User Interface

Table Input Device Serial Communication

Flow Chart Wireless Communications Module

Central System Process Flow

VIDEO TABLE GAME APPARATUS, SYSTEM, AND METHOD OF USE

CROSS REFERENCE TO RELATED APPLICATIONS

This application claims priority through, and hereby incorporates by reference, two prior provisional applications; (i) Ser. No. 60/256,363, filed Dec. 19, 2000, entitled "Method and Apparatus for Adding Pick-A-Jackpot"; and Ser. No. 60/326,434, filed Oct. 1, 2001, entitled "Video Table Game Apparatus, System, and Method of Use."

FIELD OF THE INVENTION

This invention relates to table games of chance such as those provided in gaming establishments or environments. More particularly, this invention relates to a system for providing video and audio entertainment, advertising, or other information, or additional gaming services or gaming opportunities for table games.

BACKGROUND

"Table games" are games that users play at a table rather than at, for example, a slot machine. Examples of table games include card games like blackjack, poker, baccarat, and Pai Gow, as well as craps and roulette.

Casinos have long sought for ways for make table games more exciting or interesting for game players and customers. One prior art attempt to achieve this object has been the addition of conventional side wagering options for players at the table game. In this manner, a game player is provided the opportunity not only to place the conventional primary wagers of the types typically required to play the underlying table game but also, at differing times, to place additional "side wagers," or bets, on the occurrence of events during the table game.

For example, in a blackjack table game, the player typically places a conventional primary wager at the commencement of the game in order to have the opportunity to win the wager, and bonus or award, based on the contents of the player's hand (i.e., the cards dealt to the player during the game) against the contents of the dealer's hand (i.e., the cards dealt to the dealer during the game). The conventional, prior art side wager in this type of table game typically provides the player the opportunity to place an additional wager on a dedicated and marked location on the table for the player to bet on the occurrence of an particular events, such as a particular combination of cards being dealt to the player during the game. In the event that the particular card combination is then dealt to the player, the player wins an award or bonus in addition to that possible in the underlying conventional game of blackjack.

Gaming establishments and providers have tried to provide increased player excitement and interest by adding other features in the game table environment. Examples include improved lighting, music, and overall gaming ambience and atmosphere. Other examples include automation of the underlying table game itself such as by providing an automated video screen interface mounted on the table and dealing and displaying, e.g., the blackjack cards via the screen rather than physically dealing physical cards to the players. In these types of limited video screen table games, each card player, except the house dealer, has a video screen mounted in the table so that it is viewable only that one player.

While these types of prior art table games and related gaming environments can provide a level of increased excitement and interest for many game players, the applicant has discovered that more can be done to make the side wagering opportunity much more interesting and exciting. For example, the applicant has discovered that the conventional side wagering opportunity is fairly static and redundant—it usually provides much the same type of side wagering opportunity for the primary game over time and that side wagering opportunity is itself fairly conventional since it is typically based on the occurrence of events in the underlying table game. The applicant has discovered that the conventional, relatively static side wagering opportunity presents a limitation and problem. In this regard, the conventional side wagering opportunity does not maximize the opportunity for the side wagering game to increase interest and excitement if it is not static or if it were to provide yet additional gaming opportunities or entertainment options for the table game players.

The applicant also has discovered that more can be done to not only render the table game more varied and exciting, but also that doing so through video system can provide the gaming establishment with other opportunities to increase player interest, loyalty, or excitement and increase revenue opportunities for the gaming establishment.

BRIEF SUMMARY OF THE INVENTION

The present invention provides a system for providing video information, entertainment, or additional gaming service or services for at least one underlying table game. The system provides at least one video screen connected to a computing unit, and the video screen is mounted in association with a table game table, visible to a plurality of the players of the underlying table game at the game table. The Computing unit and screen cooperatively provide to the players of the table game video information in addition or supplemental to that of the underlying table game.

In one embodiment, the system provides a plurality of video screens mounted in association with a plurality of table game tables. Preferably, each of the video screens is connected to a central computing unit or server, and the central computing unit runs a table game video management system.

Most preferably, the video management system and computing unit (or central computing unit or server as the case may be) cooperatively provide, or are adaptable to provide, varying video information, entertainment, or additional gaming opportunity or service for the game players at the gaming table (or plurality of gaming tables as the case may be).

In a particularly preferred embodiment, the system includes at least one side wagering or bonus game input device mounted in association with at least one game table. The input device is preferably connected to the computing unit (or central computing unit or server as the case may be).

Most preferably, the input device, video screen, and computing unit cooperatively provide an interactive supplemental game service, such as, for example, a bonus or side wager game for the game players of the underlying table game at the table game table associated with the video screen. Most preferably, they also cooperatively provide, or can readily be adapted to provide, a variety of additional types of entertainment or informational video or image content, such as for example, sports, music, news, financial, attract, or advertising content.

Most preferably, the input device, video screen, and computing unit provide a gaming establishment or other business with new methods of gaming, attracting, entertaining, and retaining customer game players, and generating revenues and profits.

In a preferred embodiment, the system provides both video and text or image banner content on the video display at a table game.

There are additional novel aspects and advantages of the preferred embodiment of the present invention. They will become apparent as the specification proceeds, including by way of the Detailed Description below and the Claims.

Examples of such additional aspects disclosed below include the various types of side wagering games and methods of use and doing business with the disclosed apparatus and systems in, for example, a casino or other gaming establishment.

BRIEF DESCRIPTION OF THE DRAWINGS

The applicants' preferred embodiments are shown in the accompanying drawings wherein.

I. Single Game, Stand-Alone Table Game Video System

Figure 1:
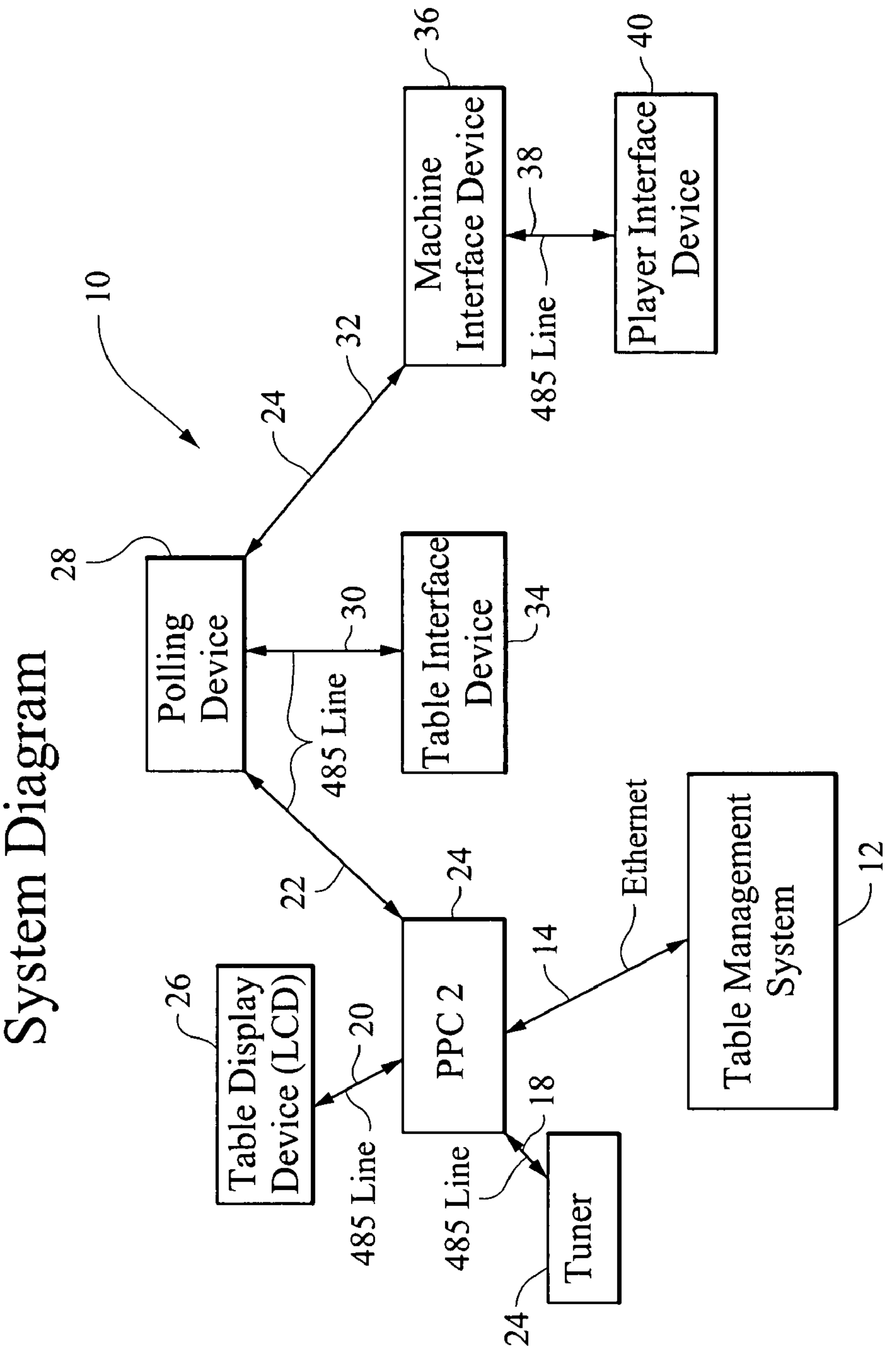
FIG. 1 is schematic view of a stand-alone embodiment of the present video table game system.
Figure 2:
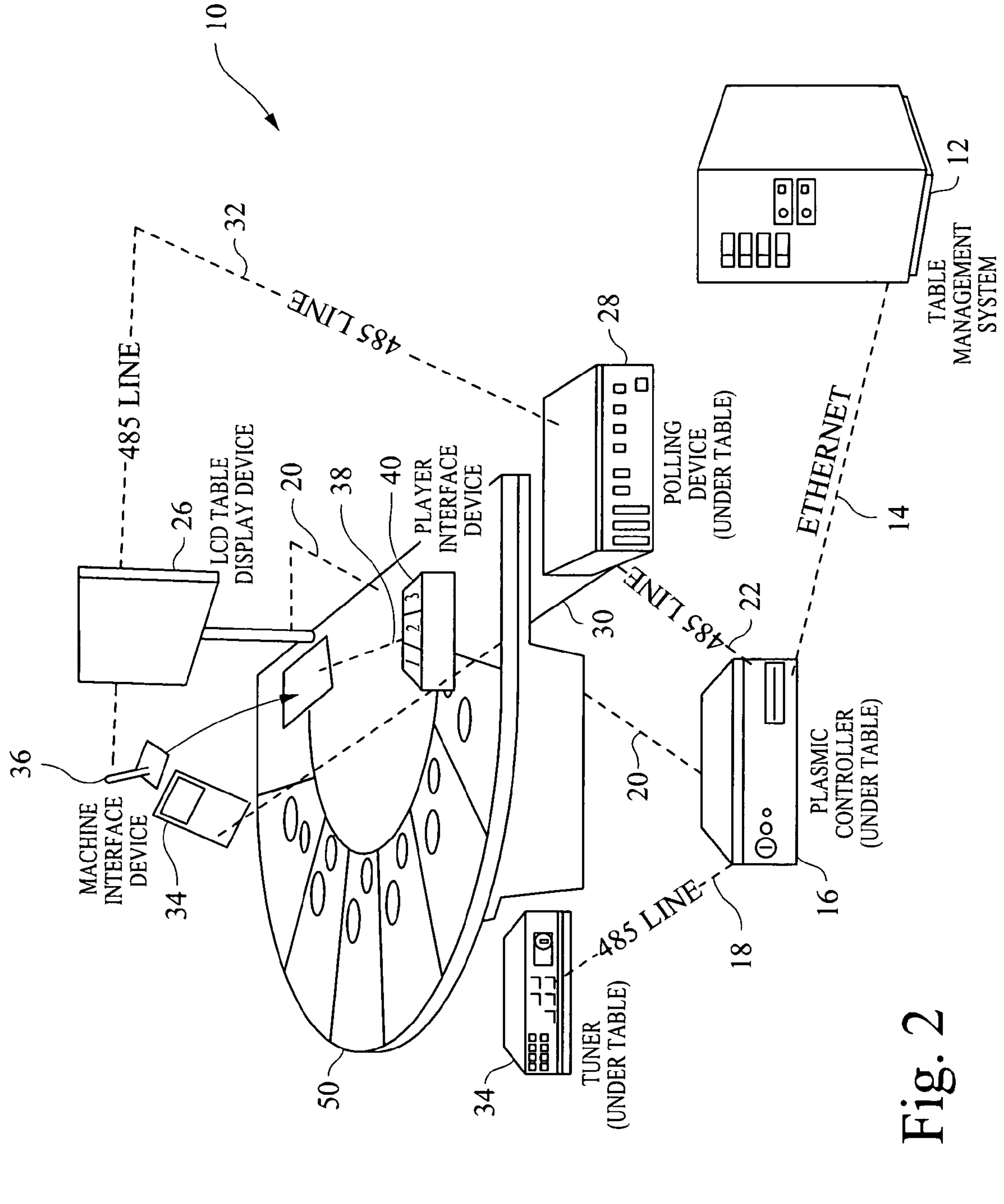
FIG. 2 is combination pictorial and schematic view of the stand-alone video table game system of FIG. 1.

With reference to FIGS. 1 and 2, a single table 50, stand-alone embodiment of the present video system, generally 10, has a table management system computer 12, running a table management system ("TMS," not shown in FIGS. 1 and 2), connected by an Ethernet line 14 to a PPC2 Paltronics™ Plasma Controller 16 (available from Paltronics Corp of Chicago, Illinois). The PPC2 16 is connected by industry-standard 485 lines (VGA cables) 18, 20, 22 to an audio/video tuner 24, a 15" Sony or Phillips LCD flat-panel table display device ("TDD") 26, and a Paltronics™ polling unit 28, respectively. In turn, the polling unit 28 is connected by additional 485 lines 30, 32 to a HandSpring™ table interface device ("TID") 34 and a machine interface device ("MID") 36, respectively. Finally, the MID 36 is also connected by a separate 485 line 38 to a player interface device 40 ("PID," Paltronics™ Model 141, with 8051 processor, available from Paltronics Corp. of Chicago, Illinois).

The TMS 12 is a conventional Pentium III or IV PC and has a conventional monitor, keypad, and mouse (not shown). The TMS 12 runs Windows NT and software written in C++. The TMS 12 provides the central system 10 interface for configuring the system and scheduling of events in the system 10.

The tuner 24 may be connected to a VCR, television, cable video source, or other video device (not shown in FIGS. 1 or 2). The video source selected by the tuner 24 is forwarded over the 485 line to the PPC2 16.

The PPC2 16 is a video content controller running embedded Windows NT 4.0 loaded on an internal flash RAM. The PPC2 16 also can contain local digital video storage on which a bonus or side wager video game can be stored if desired for, e.g., regulatory reasons. The PPC2 16 receives digital video information from the TMS 12 and from, as noted above, the tuner 24. The PPC2 16 contains a high quality MPEG video card and digital audio card (not shown), all of which are standard off-the-shelf items. The PPC2 thus provides digital video and audio content to the TDD 26 (which also provides audio output) from the tuner 24, the TMS 12, or locally stored video or audio on the PPC2 16.

The polling unit 28 runs a controller program (written in C) and polls the connected PPC2 16, TID 34, and MID 36. Depending on the instructions provided by these connected devices 16, 34, and 36, the polling unit manages and arbitrates the communication between the PPC2 16, the TID 34, the MID 36, and the PID 40.

The TID 34 is a standard hand-held palm computer programmed with the Palm Operating System. The preferred TID 34 is the Visor Deluxe from Handspring Co. but many different types of microcontrollers could be substituted and perform the functions of the preferred Visor Deluxe TID 34. The TID 34 allows the table game dealer to change video input or video channel content provided as output by the PPC2 16 and thereby displayed on the TDD 26, adjust volume of the sound output from the speakers associated with the TDD 26, start a bonus or side wager game from the PPC2 16 for viewing on the TDD 26, and turn the system 10 on and off.

The MID 36 (Model Pal 141 by Paltronics, supra) receives player input information from the PID 40 and forwards that information to the polling device or unit 28. Although the MID 36 and PID 40 are interconnected by a conventional 485 line 38 in the depicted embodiment, the system may readily employ other communication lines well known in the art, including either optical or radio frequency links and communication formats and protocols.

The various system devices 16, 24, 26, 28, 34, 36, and 40, except the TMS 12, can each communicate with each other by a unique packet-based protocol. Each packet of information includes five data types: 1. an "FF," which identifies the start of a packet; 2. an "ID," which identifies the device (16, 24, 26, 28, 34, 36, or 40) to which the packet is directed; 3. "Type," which identifies the type of content in the packet (such as a command or data); 4. "Length Short," which identifies the number of bytes of information in the packet as being the same or less than the standard packet maximum, and if the amount actually received for the packet is less or more than this number, then receiving device ignores the packet; and 5. "Length Long," which identifies the number of bytes of information in the packet as being longer than the standard packet maximum, allowing the device to look for and read more than the standard packet maximum.

The TMS 12 communicates only with the PPC2 16, and vice versa (except in the case of the utilization of, and TMS 12 communication with, the alternative embodiment of FIGS. 11 and 12 as described below). This communication is through a conventional "folder" transfer format utilizing the Ethernet protocol, which is well known to those skilled in the art. Each folder is a list of digital files transmitted from the TMS 12 to the PPC2 16. As the TMS 12 transfers a folder to the PPC2 16, the TMS 12 also transfers the digital files identified in the folder. These files can include video clips, video or banner advertisements, image bitmaps, and ticker data or banners. Each such file is transferred with an associated start and end time or play interval (for replaying at the expiration of the play interval).

Each folder on the TMS 12 is established by operation of the TMS 12 in a fashion well known to those skilled in the art. The operator of the TMS 12 works through Windows interfaces to establish and schedule the various files and their arrangement in the folders to be transferred to the PPC2 16. The operator can use standard drag-and-drop and file generation, inspection, and arrangement commands and techniques. The operator also can preview or play media files locally on the TMS 12.

The PPC2 16 receives the folders, files, and scheduling information and places them in a scheduling array. The PPC2 16 then plays and distributes the files according to the information in the scheduling array except as commanded to do otherwise by instructions received from the polling unit 28. Such commands can include commands from the MID 36 or TID 34, such as a command from MID 36 to play and display on the TDD 26 a bonus or side wager game (stored on the PPC2 16 and played through the MPEG card on the PPC2 16), or to have a bonus or side wager game displayed on TDD 26 respond to a command input by the game player through the PID 40 and ultimately received and processed at the PPC2 16.

In order to display video or image information at the TDD 26, the system 10 utilizes the conventional video and image key-color-overlay system (RGB –05040). According to this industry-standard system, each item of MPEG video information to be displayed is allocated to particular key color, and other items of video information, are allocated to non-key colors. The system thus displays the MPEG video information according to the key color allocation scheme for the screen and displays non-MPEG information according to the non-key color allocation scheme for the screen.

In order to add a non-MPEG ticker to the bottom of a screen displaying MPEG video on the screen, the ticker is allocated to a non-key color for display on the portion of the screen reserved at the time of screen design for that particular non-key color. As a result, the MPEG video is displayed on the portion of the screen reserved for the MPEG video's particular key color, and the ticker is displayed on the differing portion of the screen reserved for the ticker's particular non-key color.

In the preferred embodiment of the present system 10, the screen layout (key and non-key color allocation described above) is designed by the system operator at the TMS 12. The TMS 12 thus generates a conventional screen script in a fashion well known to those skilled in the art, and the TMS 12 sends this information to the PPC2 16 for implementation on the TDD 26.

Figure 3:
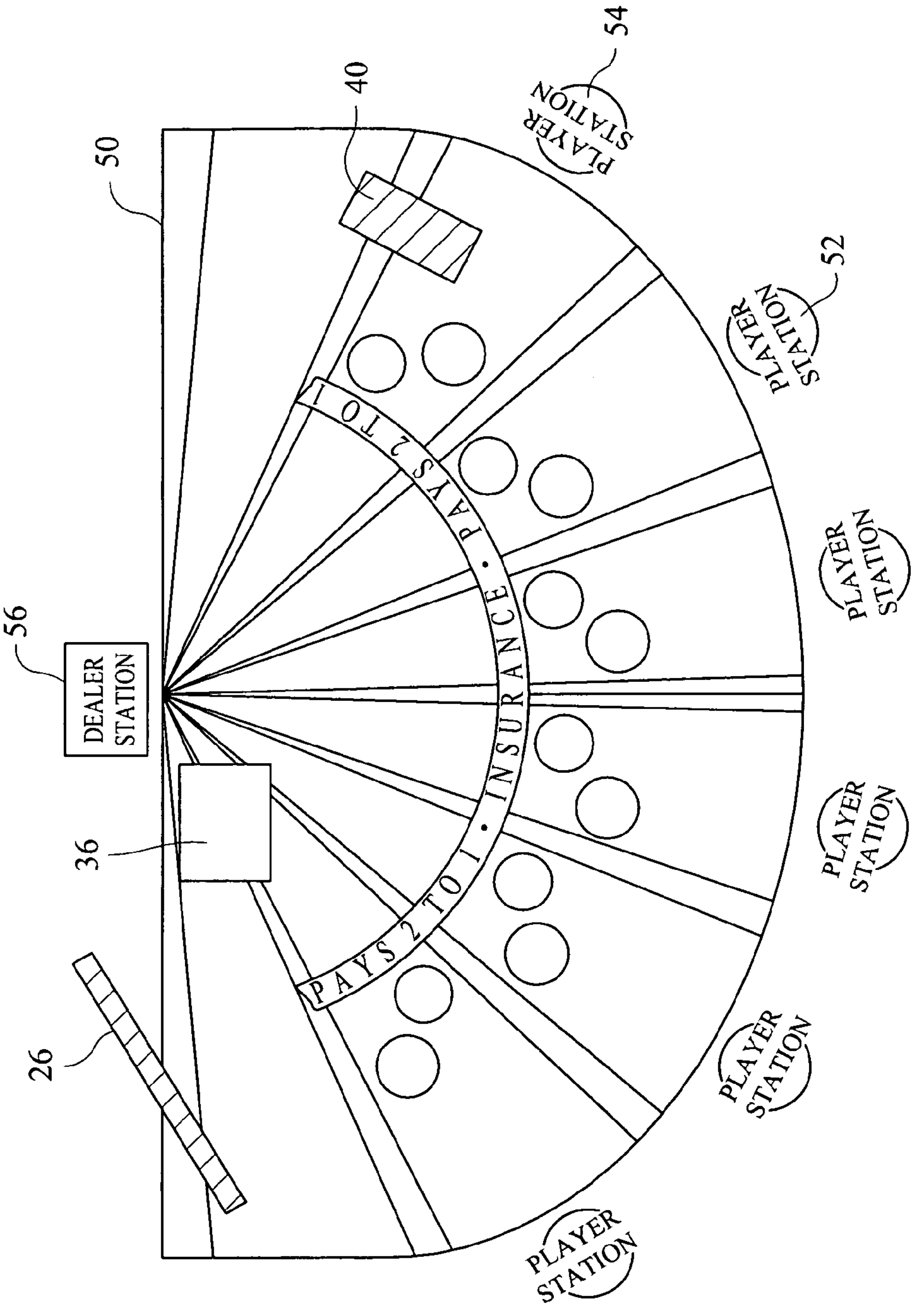
FIG. 3 is a top elevational view of the gaming table in the present video table game system.

As shown in FIG. 3, each game table 50 may provide: (i) a number, e.g., 52, 54, of player stations or locations, at each of which a single game player may sit or stand in order to play a table game at the game table 50; and (ii) a central game player or dealer station or location 56. The TDD 26 preferably is arranged to be readily viewable by all game players at the player locations, e.g., 52, 54, and by the player or dealer at the dealer station 56 at the game table 50. In addition, the dealer station 56 provides the dealer with the ability to easily reach the MID 36 and the TID 34; and the dealer can move the PID 40 from place to place around the game table 50 as desired or required to allow a given game player the opportunity to readily reach and press input buttons (not shown) on the PID 40. Thus, in the example of FIG. 3, the player at player station 54 can reach and press input buttons on PID 40 when the PID 40 is located directly adjacent the player's player station 54.

Figure 10:
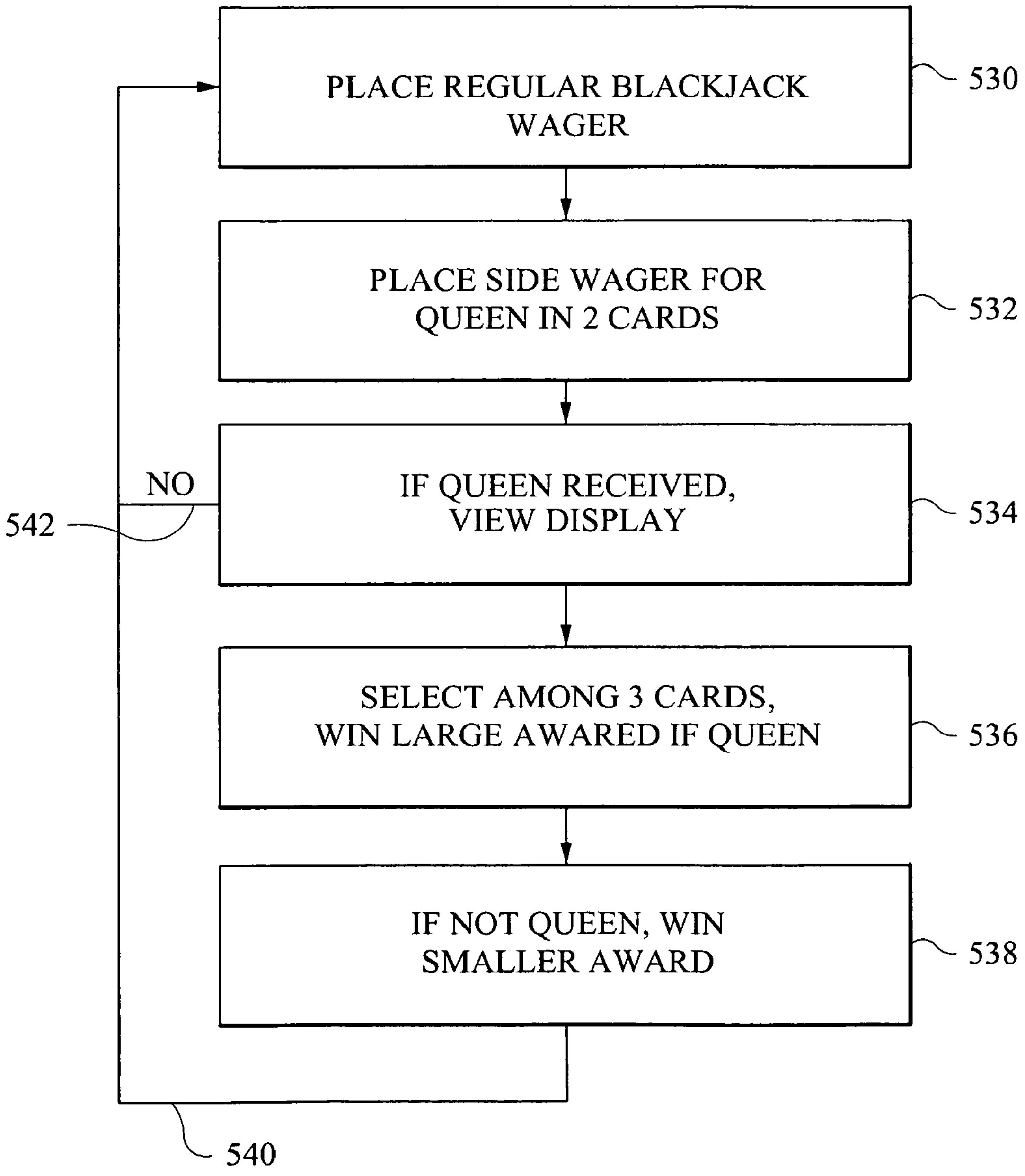
FIG. 10 is a flow chart showing the procedure for a game player to use the video system of FIGS. 1-5 to play a particular side wager game in connection with playing an underlying blackjack card game.

In this table game 50, the players at the table game are offered the opportunity to play a supplemental side-wager game, such as, for example, a game entitled "Follow the Queen" described below, in the event that certain bonus game awarding activities take place in the underlying base blackjack game to be played at the game table 50. The rules for this example "Follow the Queen" side wager game are set forth in a brochure or sign made available to the game players such as shown in FIG. 10. It is understood, of course, that this particular side wager game (as set forth in FIG. 10 and accompanying text), and the nature of the base game to be played at the game table 50, are illustrative of the many types of base table games and supplemental bonus or side wager games that may be implemented by the present system 10 of FIGS. 1-3.

Figure 11:
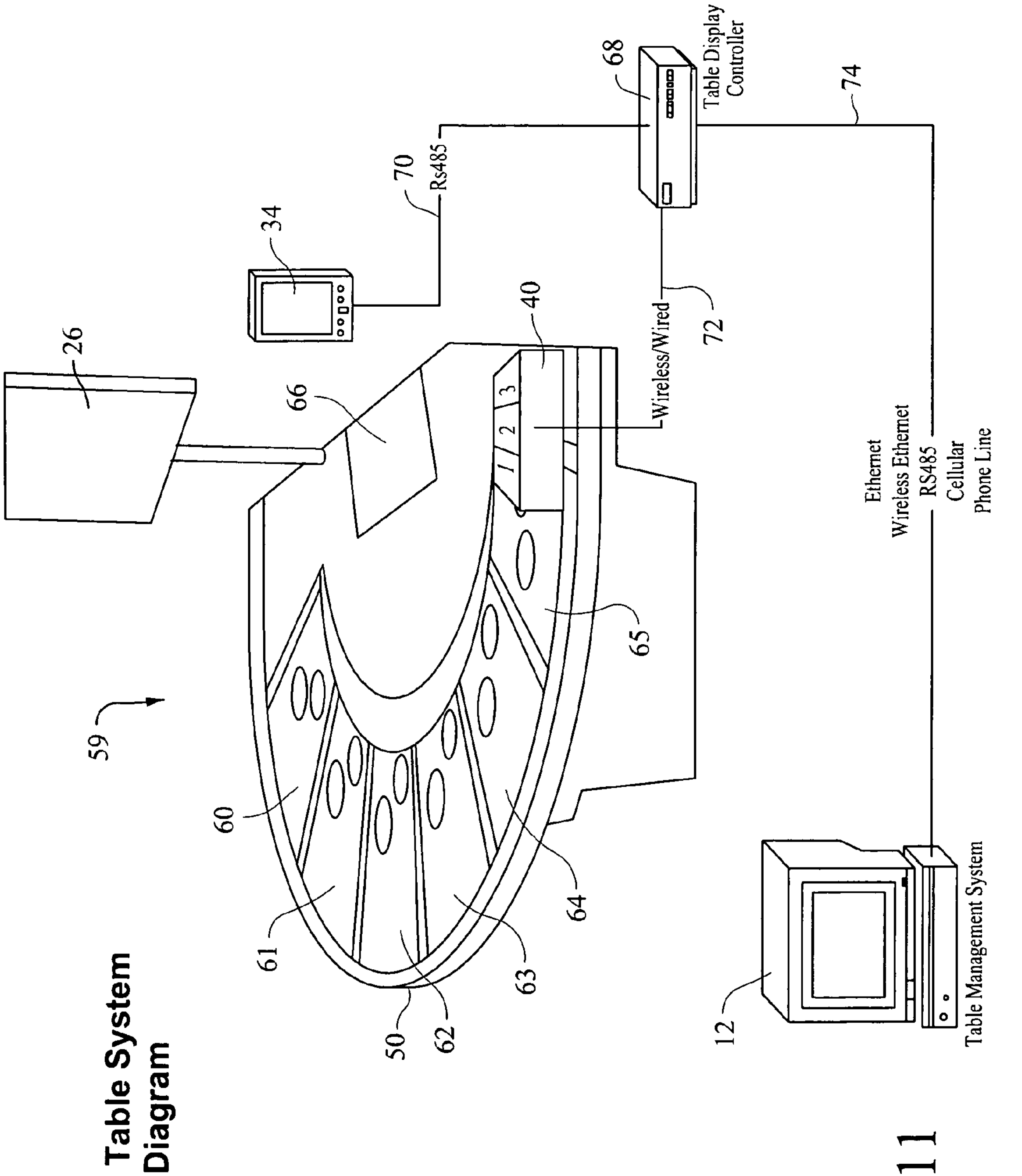
FIG. 11 is a pictorial view of an alternative stand-alone embodiment of the present video table game system.

Turning now to FIG. 11, an alternative table game system, generally 59, to the table gaming system of FIG. 2 includes a table game table 50 with six player locations 60-65 and one dealer location 66 opposite the player locations 60-65 on the table 50. The table game table 50 also includes a video screen or TDD 26 spaced above the table 50 in order to be readily and preferably simultaneously viewable by game player (not shown) at the player locations 60-65 and the dealer location 66. The table game table 50 also has a PID 40 movably mounted on the upper surface of the table 50 in order to move among game players at the player locations 60-65.

The FIG. 11 system 59 also includes an alternative table display controller 68 providing the functionality, in one box, of the PPC2 16, the MID 36, polling unit 28. and tuner 24 of the FIG. 2 system 10. This table display controller 68 is connected to: the table interface device ("TID") 34 by an RS485 line 70; the PID 40 by a wireless or wired interface 72; and the TMS 12 by either a wired or wireless Ethernet, RS485, telephonic, or cellular connection 74.

Figure 12:
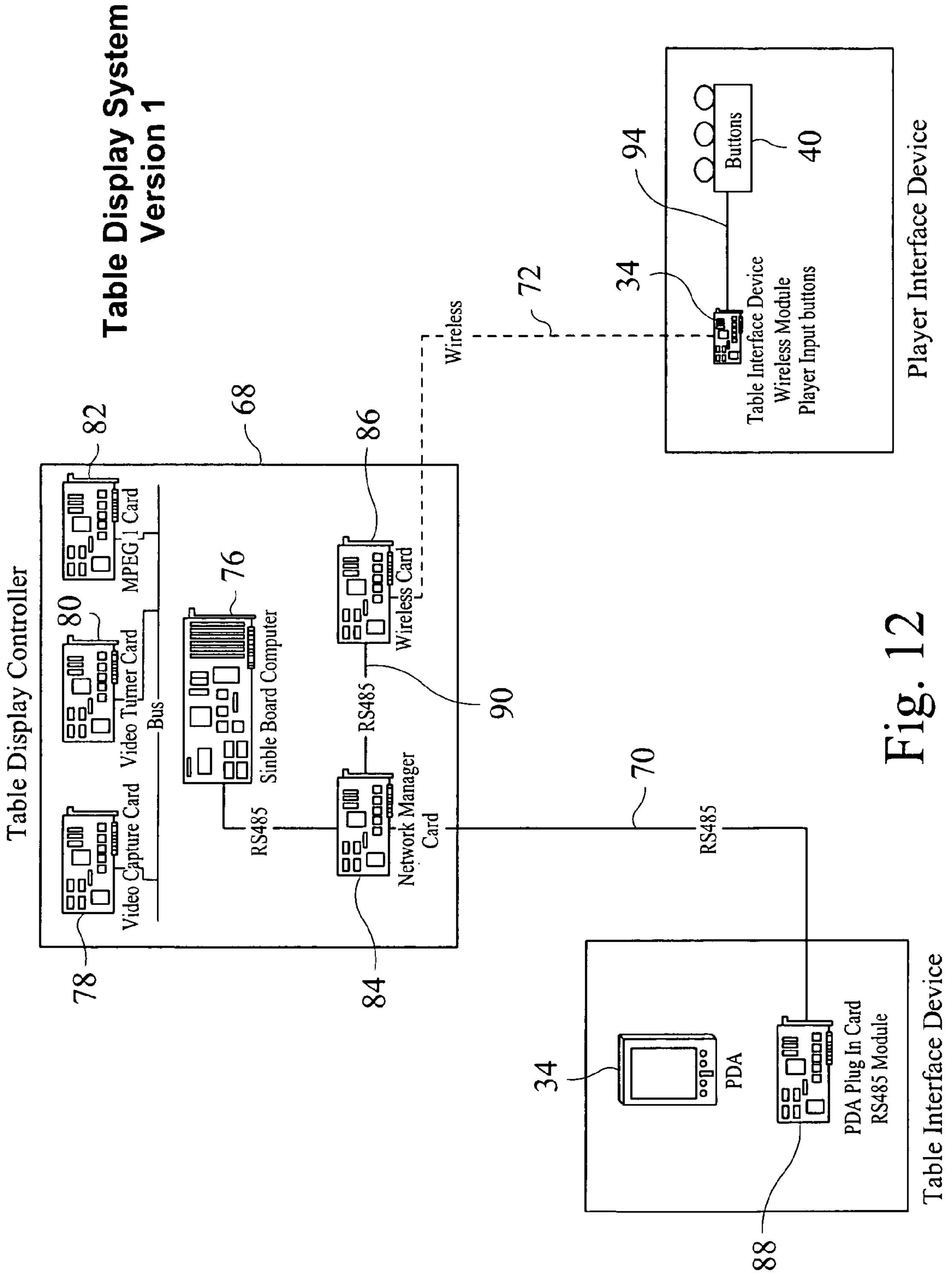
FIG. 12 is a schematic view of one embodiment of the table display controller or system in the network system shown in FIG. 11.

With reference now to FIG. 12, the table display controller 68 of FIG. 11 may, in one embodiment, include a computer housing (not shown) with a single board computer 76 mounted on a PCI BUS board (not shown) in a fashion well known to those skilled in the art. Also mounted on the PCI BUS board are a Mutech video capture card 78, a video tuner card 80, a Netstream MPEG I Card 82, a network manager card 84 (such as a Paltronics network manager card), and a wireless interface card 86.

The network manager card 84 is connected to, and thereby in communication with, a PDA plug-in card 88 with an RS485 module on the card 88. This RS485 PDA plug-in card 88 is mounted in the PDA TID 34 in a fashion well known to those skilled in the art. Although not shown in FIG. 12, the network manager card 84 is also connected to, and thereby in communication with, the TMS 12 as shown in FIG. 11.

The wireless interface card 86 is connected by an RS485 connection 90 to the network manager card 84 in the table display controller 68. This wireless interface card 86 is also connected by a wireless radio frequency connection 72 to a wireless interface card (not shown) also mounted within the PDA TID 34 in a fashion well known to those skilled in the art. In turn, the PDA, TID 34 is connected by a second wireless radio frequency connection 94 to the PID 40.

Figure 13:
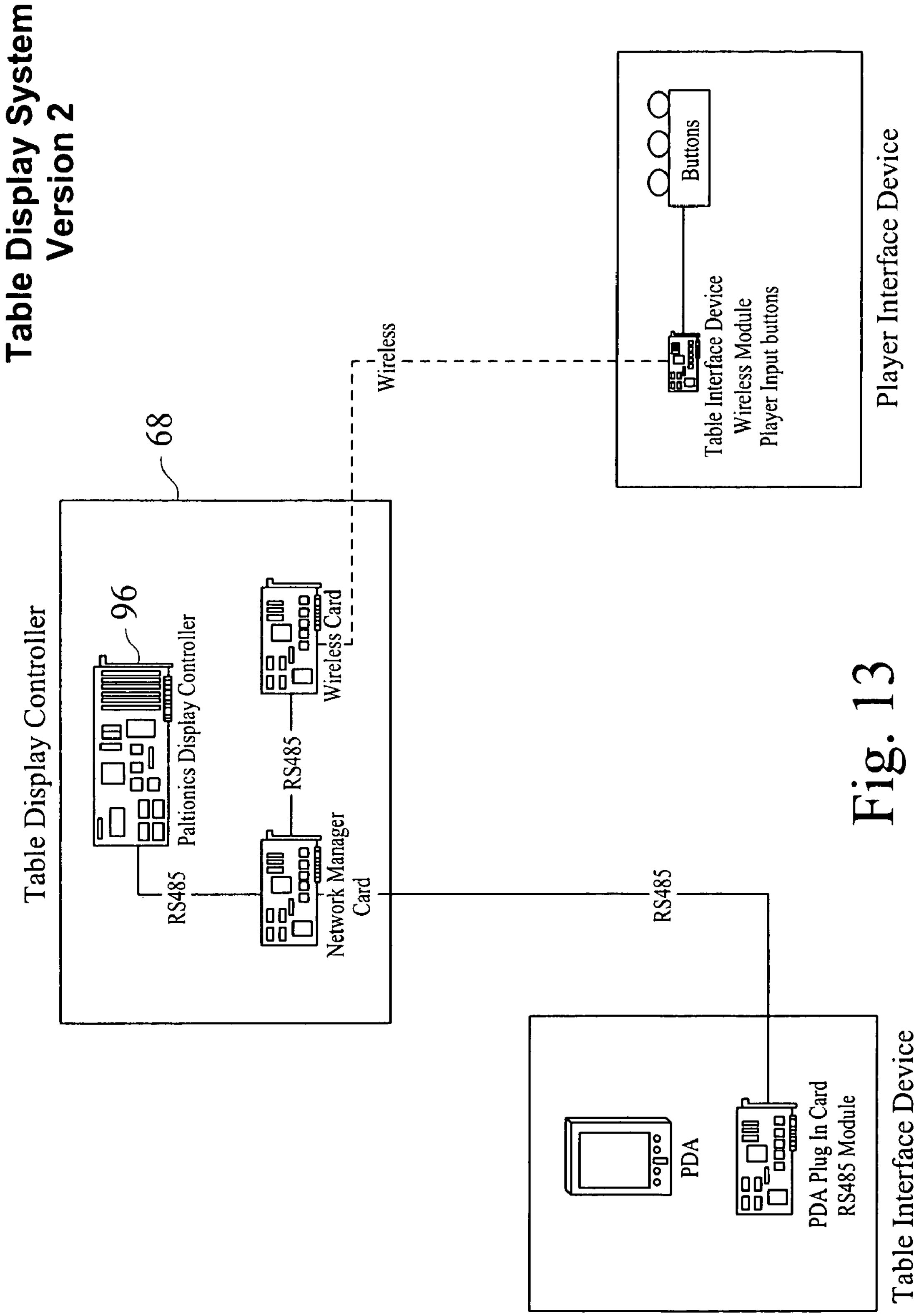
FIG. 13 is a schematic view of an alternative embodiment of the table display controller or system in the network system shown in FIG. 11.

With reference now to FIG. 13, an alternative embodiment of the table display controller 68 of FIG. 11 may include a Paltronics Display Controller 96 available from Paltronics identified above. The Paltronics Display Controller 96 is mounted in a housing on a Paltronics Pentium III or IV compatible personal computer motherboard (not shown) which is adapted to include the functionality of the above-referenced (FIG. 12) video capture card, video tuner card, and MPEG I card and associated inputs and outputs (not shown in FIG. 13). This FIG. 13 embodiment also includes the other elements of the TDD 68 and associated structures described above with reference to the FIG. 12 embodiment.

Figure 14:
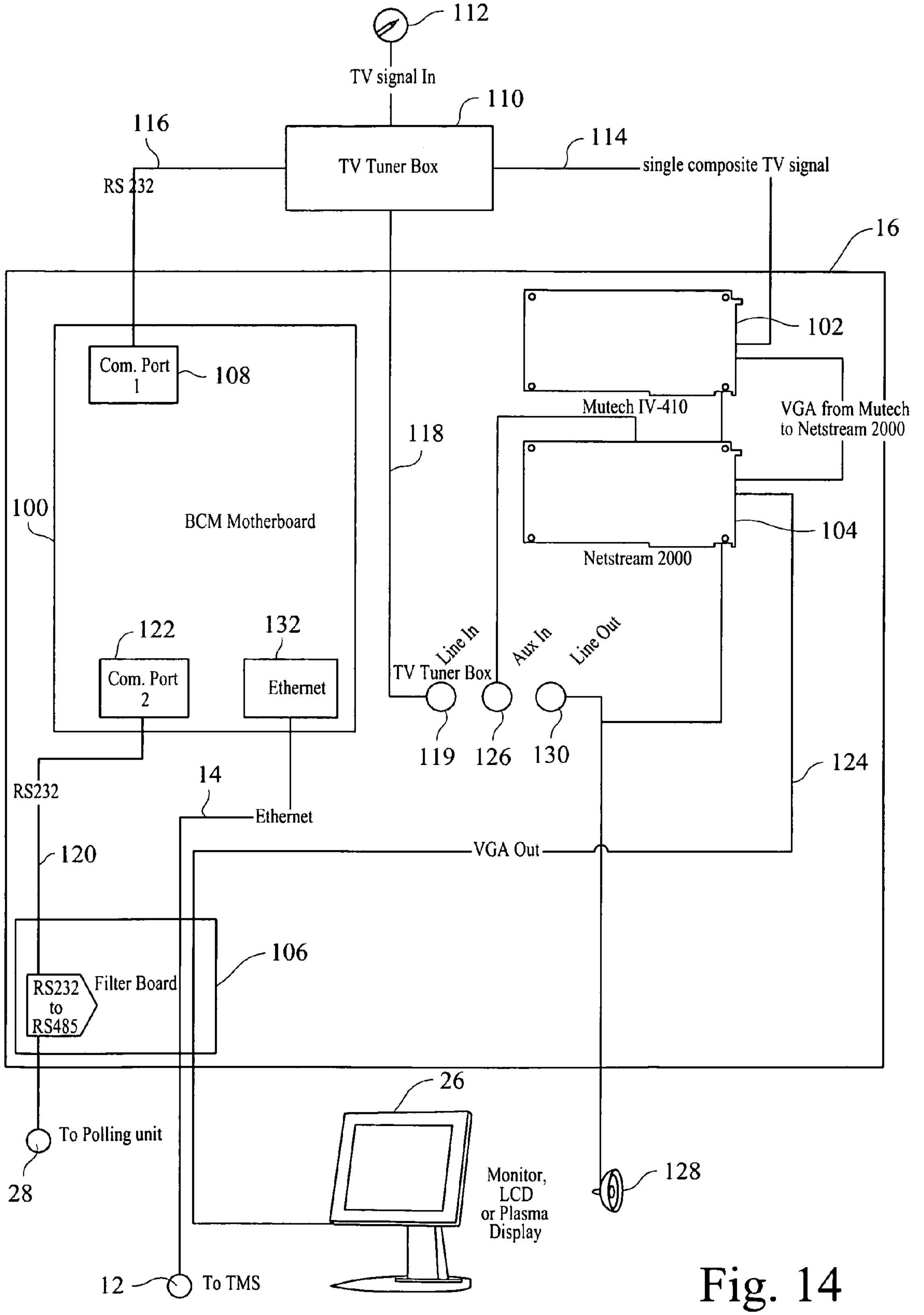
FIG. 14 is a schematic view of the components in, and high level connections within and to and from, the Paltronics Plasma Controller in the stand-alone system of FIGS. 1 and 2.
Figure 15:
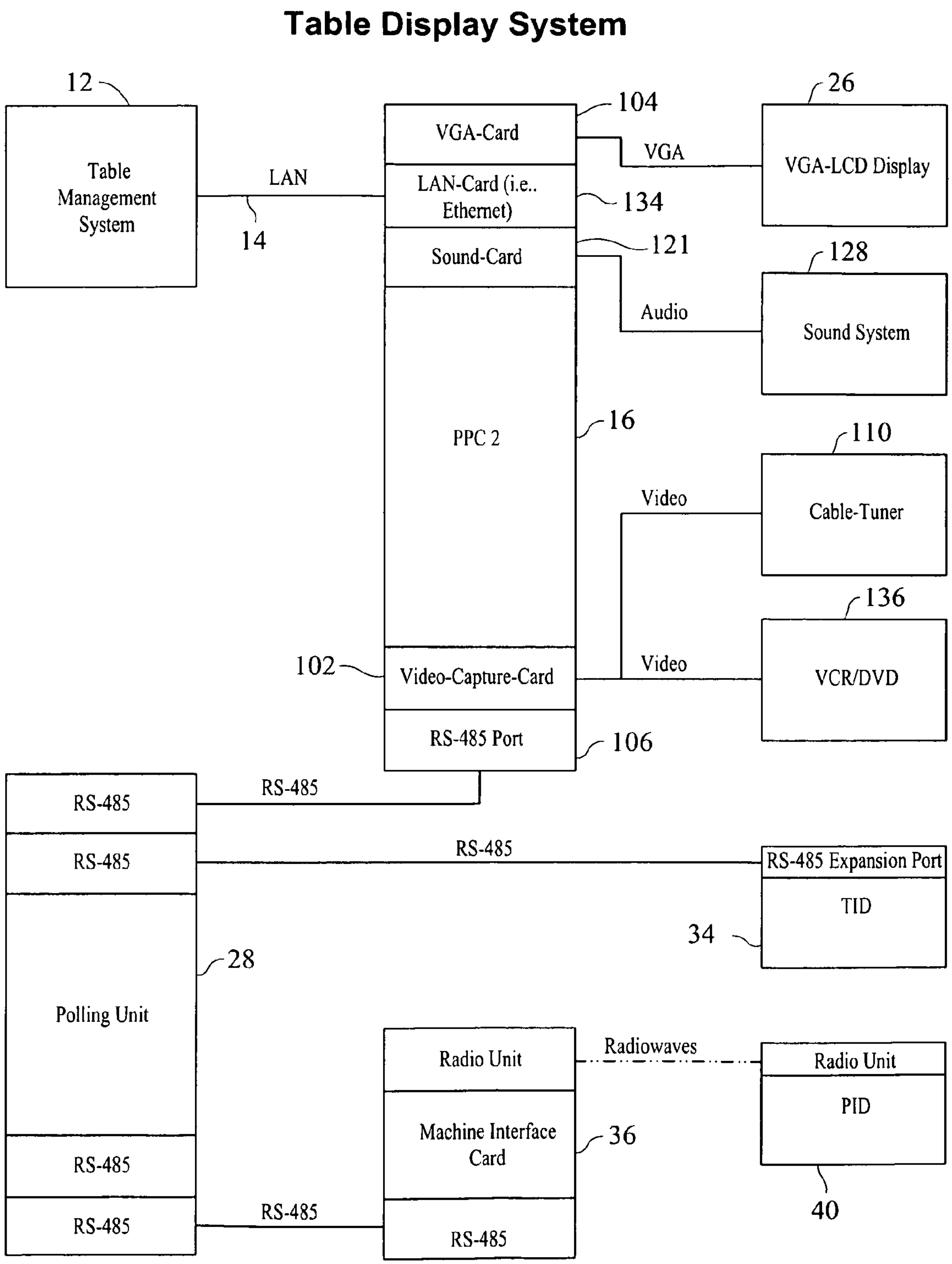
FIG. 15 is a schematic view of components and connections between devices within the stand-alone system of FIGS. 1 and 2.

Referring now to FIGS. 14 and 15, the PPC2 16 of FIG. 1 includes a conventional personal computer style housing (not shown in FIG. 14) and a conventional BCM 815 motherboard 100 with a Pentium III CPU (not shown), DVDROM drive, Paltronics flash card board with conventional flash memory, and hard drive mounted within the housing. A Mutech IV-410 video capture card 102, a Sigma Designs Netstream 2000 video card 104, and Paltronics RS232-to-RS485 filter card 106 are mounted in PCI slots (not shown) in the BCM motherboard 100. The filter card 106 is also connected by an RS232 connection 120 to the COM 2 port 122 on the BCM motherboard 100. In turn, the filter card 106 is connected as shown in FIGS. 14 and 15 to the polling unit 28.

The filter card 106 performs a conversion of RS485 communication into RS232 communication for input on the PPC2's comport, and vice versa. This is the same function performed externally by RS485-to-RS232 conversion boxes available commercially from sources such as B&B Electronics. The filter card 106 does the same thing internally and provides more RS485 communication ports than provided by commonly available external boxes.

Still referring to FIGS. 14 and 15, the PPC2 16 is connected by its COM 1 port 108 on the BCM motherboard 100 through an RS232 connection 116 to an RS232 data port (not shown) on a Contemporary Research 232-STA TV tuner box 10. This TV tuner 110 is connected to a conventional RF TV signal source 112, such as a satellite or cable video source, and provides a single composite TV signal through an output port (not shown) by a cable connection 114 to a composite video signal input in the Mutech card 102. The TV tuner 110 provides an audio output (not shown) connected by a conventional audio cable 118 to the audio line in jack 119 in a conventional high quality audio card 121 mounted on the BCM motherboard 100.

The Mutech card 102 is connected by its VGA output port to the VGA input port on the Netstream card 104. The VGA output port of the Netstream card is connected by a conventional digital video cable 124 to the table display device 26. The Netstream card 104 is also connected to the auxiliary line in jack 126 in the audio card 121, which allows MPEG videos to have their audio routed through the audio card 121 and provides control over such audio by the PPC 216 system software.

The PPC2 16 also provides analog audio, through the audio line out jack 130 of the audio card, to external speakers 128 associated with the LCD 26 (a conventional high quality personal computer monitor such as an LCD or plasma display) in order to provide audio to the gaming table (not shown in FIG. 14). Finally, the PPC2 16 is connected, from BCM motherboard 100 through conventional Ethernet compatible cabling 14, to the TMS 12 by an Ethernet port 132 in a conventional Ethernet card 134 mounted in the BCM motherboard.

As shown in FIG. 15, the polling unit 28 is also connected to the TID 34 and the machine interface card or device 36. Also, the Mutech video capture card 102 may also receive input from other video devices or sources, such as a VCR, DVD, etc. 136, in a fashion well known to those skilled in the art.

Figure 16:
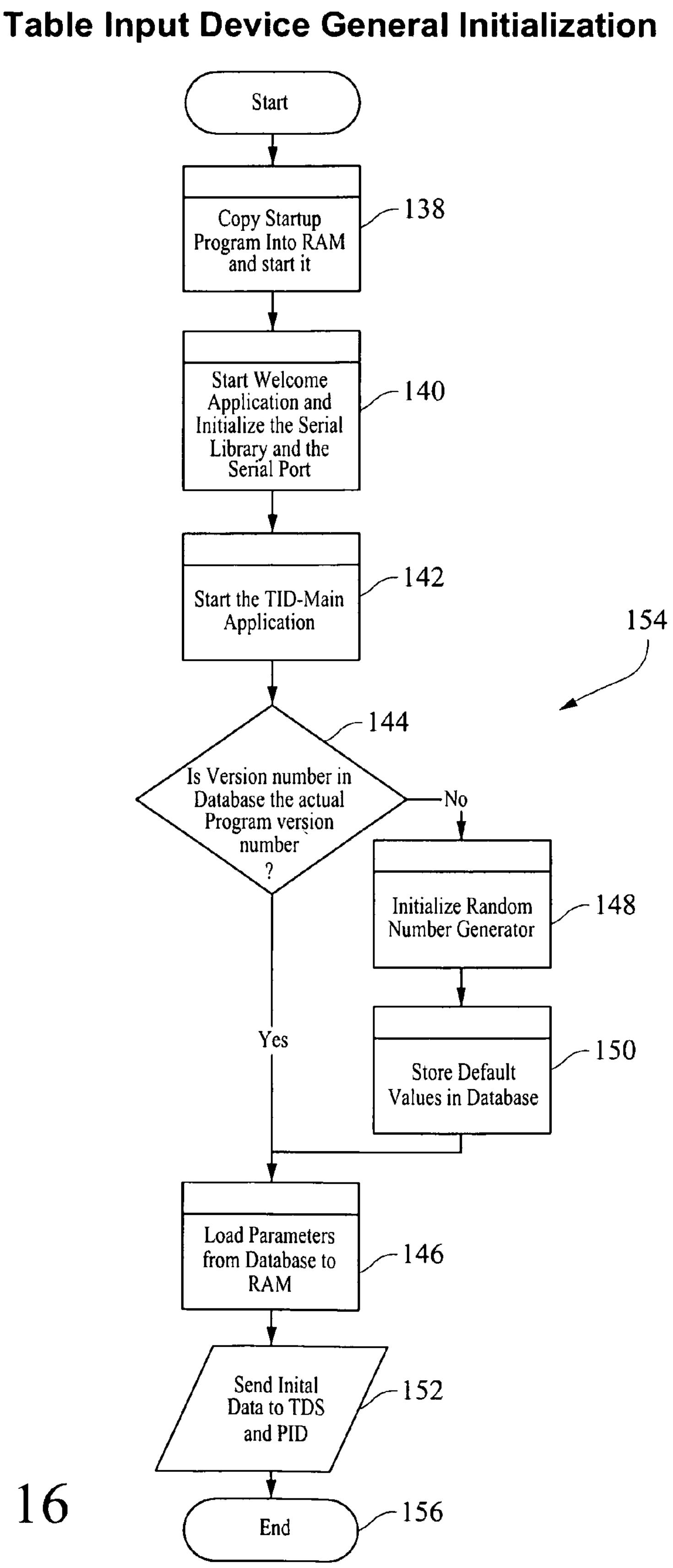
FIG. 16 is a flow chart for initialization of the software in the table input device shown in FIGS. 1 and 2.

With reference now to FIG. 16, the table input or interface device ("TID") 34 of FIG. 1 initializes, generally 154, at startup of the TID 34 by copying a startup or initialization program into RAM 138. Then, the startup program starts the welcome application and initializes serial functions 140 for the TID 34. Next, the startup program starts the TID main application 142. From there, the startup program checks the version number parameter in the TMS database to determine if it is same as the actual version number 144 loaded on the TID 34. If they are the same value, the startup program loads parameters from the database into TID RAM 146. If they are not the same, the startup program 154: (i) initializes a random number generator program 148 in order to seed it with the time of two separate user taps (or button presses) in response to screen queries on the TID 34 screen; and (ii) stores the default parameter values (version number, two random number generator (RNG) seed numbers, last selected video channel, last selected TV audio level, last selected MPEG audio level, last chosen minimum bet, last chosen maximum bet, selected table identification, PID identification, TDS parameters, and serial interface data (baud rate, parity, stop bit, number of data bits)) in the TID's database and then loads them into RAM 146. In either event, the startup program 154 then sends the initial parameters from RAM to the PID 40 and the PPC2 16 (or TDS 152 in the FIG. 11 embodiment shown below). This TID initialization routine 154 then ends 156.

Figure 17:
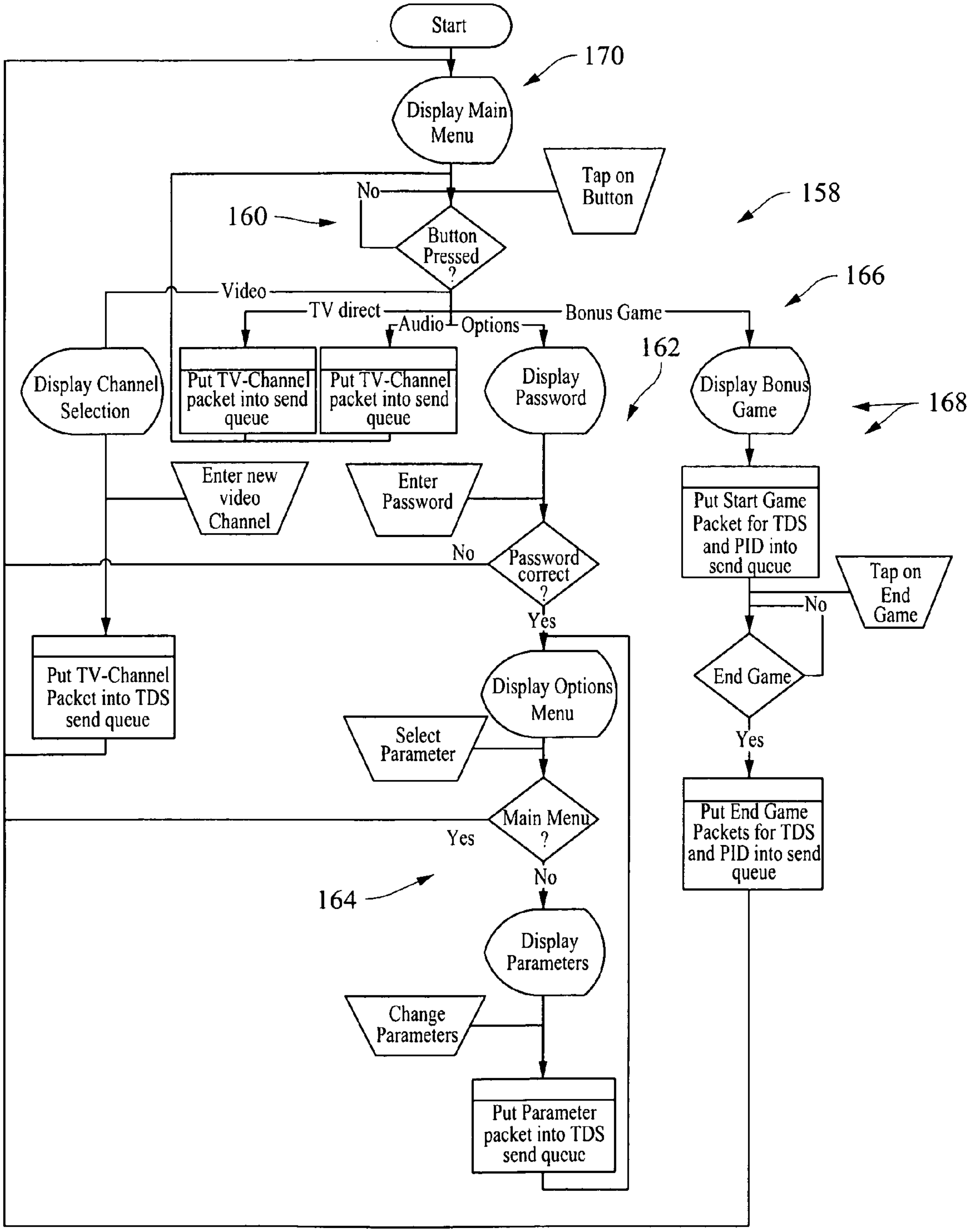
FIG. 17 is a flow chart for the operation of the user interface software in the table input device of FIGS. 1 and 2.
Figure 25A:
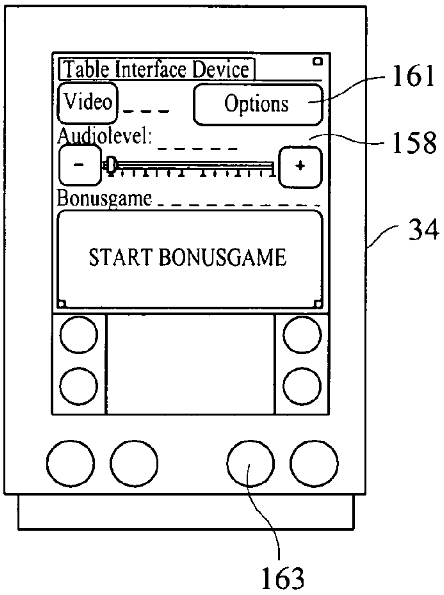
FIGS. 25A, 25B and 25C are sample plan views of the table interactive device of FIGS. 1 and 2, each such sample showing a different sample screen display on the table interactive device.
Figure 25B:
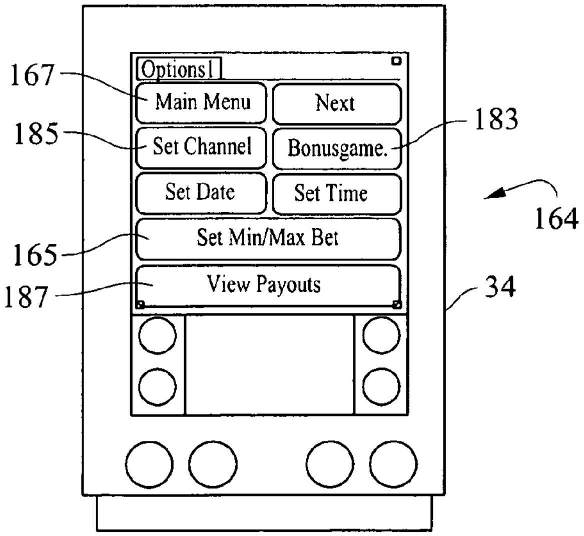

With reference now to FIGS. 17 and 25A, the TID main application 158 starts by displaying a main menu 170. The main application first responds, generally 160, when the user (e.g., table game dealer at the associated game table) taps a button, e.g., 161, 163, either on the screen or on the TID 34 itself. The main application runs a password entry routine, generally 162 and when the password is entered correctly, the main application provides, as shown in FIG. 25B, another screen 164 allowing the user to select the main menu 167, select a bonus game 183, set the video channel 185, display and change set-up parameters, generally 165, and view bonus payouts of the bonus game at the associated game table 187.

Figure 25C:
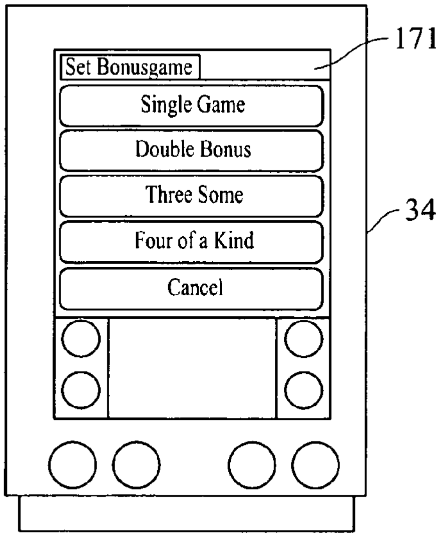

When the user (e.g., table game dealer) selects the main menu 167, a series of screens provides the user with options of selecting and playing or running, as applicable, video programs, television channel content, audio content, various bonus games (as shown in FIG. 25C), setting pertinent parameters (options) 166, viewing game status. and ending bonus games prematurely if desired (including termination of addition of any data to the pay out table on the TID 34. Upon user selection from among these alternatives, the main application forwards an authorization to play the selected content to the send queue or proceeds back through the password entry routine and associated screens to allow the user to change set-up parameters 168. When selected content plays on the TDD 26 or associated speakers according to the user's selection of the type of content desired, the main TID application 158 displays its main menu again 170, awaiting user input once again and responding accordingly as described above and shown in FIG. 17.

Figure 18:
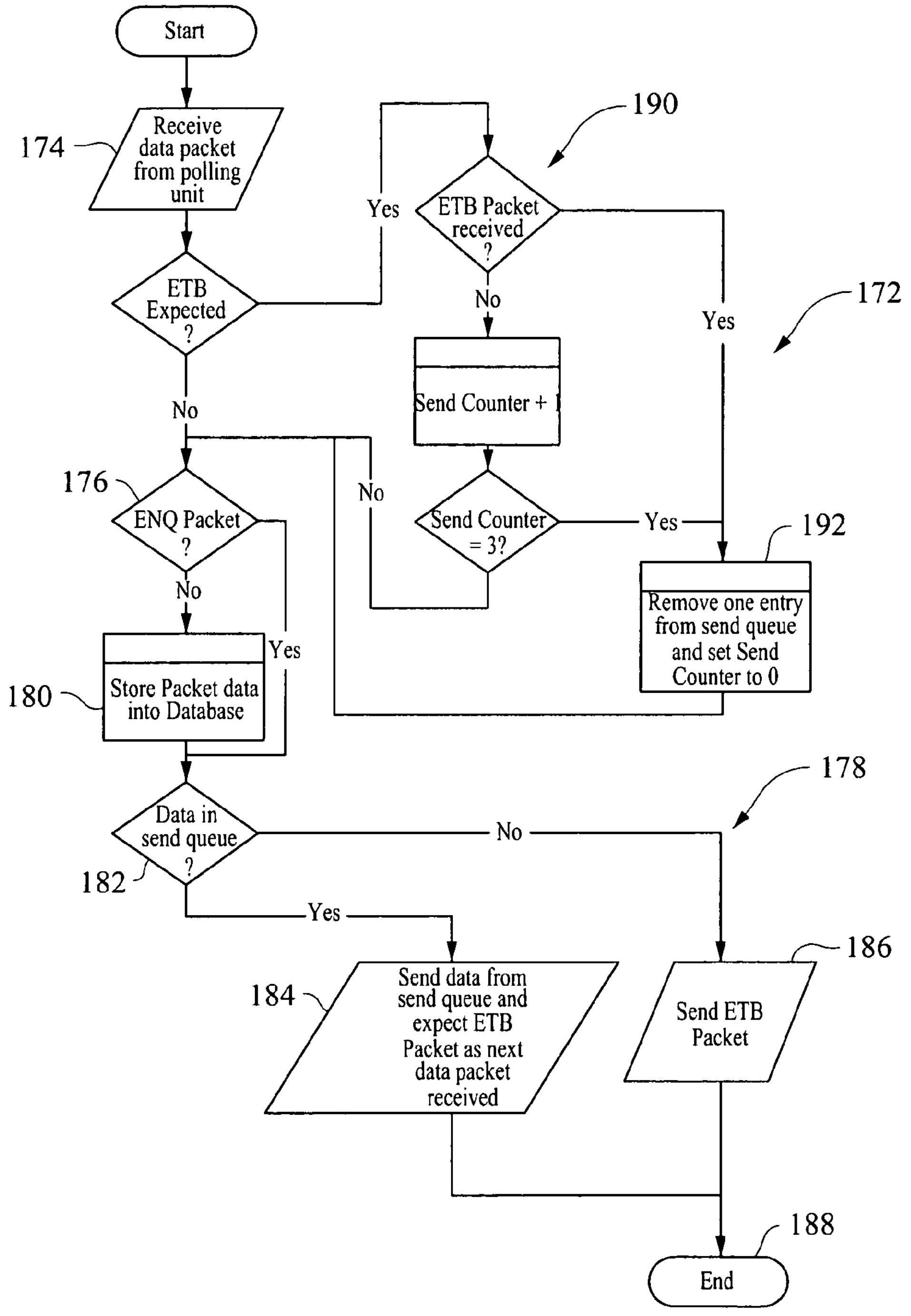
FIG. 18 is a flow chart for aerial communication in the table input device of FIGS. 1 and 2.

Turning now to FIGS. 1 and 18, the polling unit (PU) 28 periodically calls or sends query to the TID 34, the MID 36, and the TDD 26, which only respond if they are called by the polling unit 28. In this type of Master-Slave communication, the master (the PU 28) controls the whole communication process. The slaves (the TID 34, MID 36, and TDD 26) respond when the PU 28 asks them to do so. A packet in this communication consists an address for a device (i.e., the PU 28, TID 34, TDD 26, and MID 36) and some control information (Type (ENQ, ETB, etc.) and length and checksum data (which ensures the correctness of the packet)). All these devices are connected to the same hardware line (e.g., RS-485 line 32). The PU 28 queries each device (e.g., the TID 34) in sequence, via an ENQ-Packet, if it has data for another device (e g., TDD 26). If the queried device has no such data, the queried device (e.g., TID 34) answers with a ready message (an ETB-Packet). If the queried device has such data (i.e. the TID 34 has data for the TDD 26), the queried device sends such data to the desired device (i.e., TID 34 sends a data packet to the TDD 26). The receiving device (TDD 26 in the example) then answers with a ready message (ETB-Packet). This ready message signals the sending device that the sent data has been received correctly. (e.g., TID 34 receives ETB-Packet from the TDD 26, then the TID 34 knows that the data packets sent from the TID 34 to the TDD 26 were received correctly.) This ready message (ETB-Packet) also signals the PU 28 that the communication is over and that the PU 28 can take control and query another next device.

The TID's serial communication routine, generally 172 thus starts by receiving a data packet over the line connecting the TID 34 to the PU 174. If an ETB packet is not expected, this routine 172 next determines if the received packet is an ENQ packet 176. If so, the TID 34 serial communication routine 172 continues checking the send queue 182, bypassing the data storing step 180. If not, the routine 172 stores the packet data into a database 180 on the TID; and if data (such as the video channel, the TV audio level, the MPEG audio level, the Start Game command, the End Game command, other parameters (such as Min-Bet or Max-Bet) is in the send queue (a FIFO buffer) 182, the routine 172 sends the data in the send queue out on the serial communication line and prepares to expect an ETB packet as the next data packet received from the polling unit 184. If, on the other hand, data is not in the send queue, the routine 172 sends the packet as an ETB packet 186 out on the communication line. The TID serial communication routine 172 then ends 188.

If, upon receiving a data packet from the polling unit, an ETB packet is expected, the serial communication routine determines if the data packet is in fact an ETB packet 190. If it is, one entry is removed from the send queue and the send counter is set to zero 192. From there, the routine proceeds to the ENQ packet determination step 176 recited above. If, instead, the data packet is not an ETB packet, the send counter is incremented by one, and the send counter is then analyzed to determine if it equals 3. If it does, the routine 172 proceeds to the entry removal and counter reset step 192; and if it does not, the routine 172 proceeds to repeat the ENQ packet determination step 176 and succeeding steps as describe above.

This same serial communication routine, described above by reference to the TID, is also employed to manage serial communication in the other serial devices in the present embodiment. The same routine 172 thus also runs within the PU 28, the PPC2 16, the TDD 26, and the MID 36 of FIGS. 1 and 2, with one exception for the comparable serial communication routine for the MID 36. In the MID routine (not shown), when the ENQ packet determination step (176 in FIG. 18) determines that a packet is an ENQ packet, the next step is to proceed directly to sending the ETB packet (186 in FIG. 18) rather than to proceed to determining if data is in the send queue (182 in FIG. 18).

Figure 19:
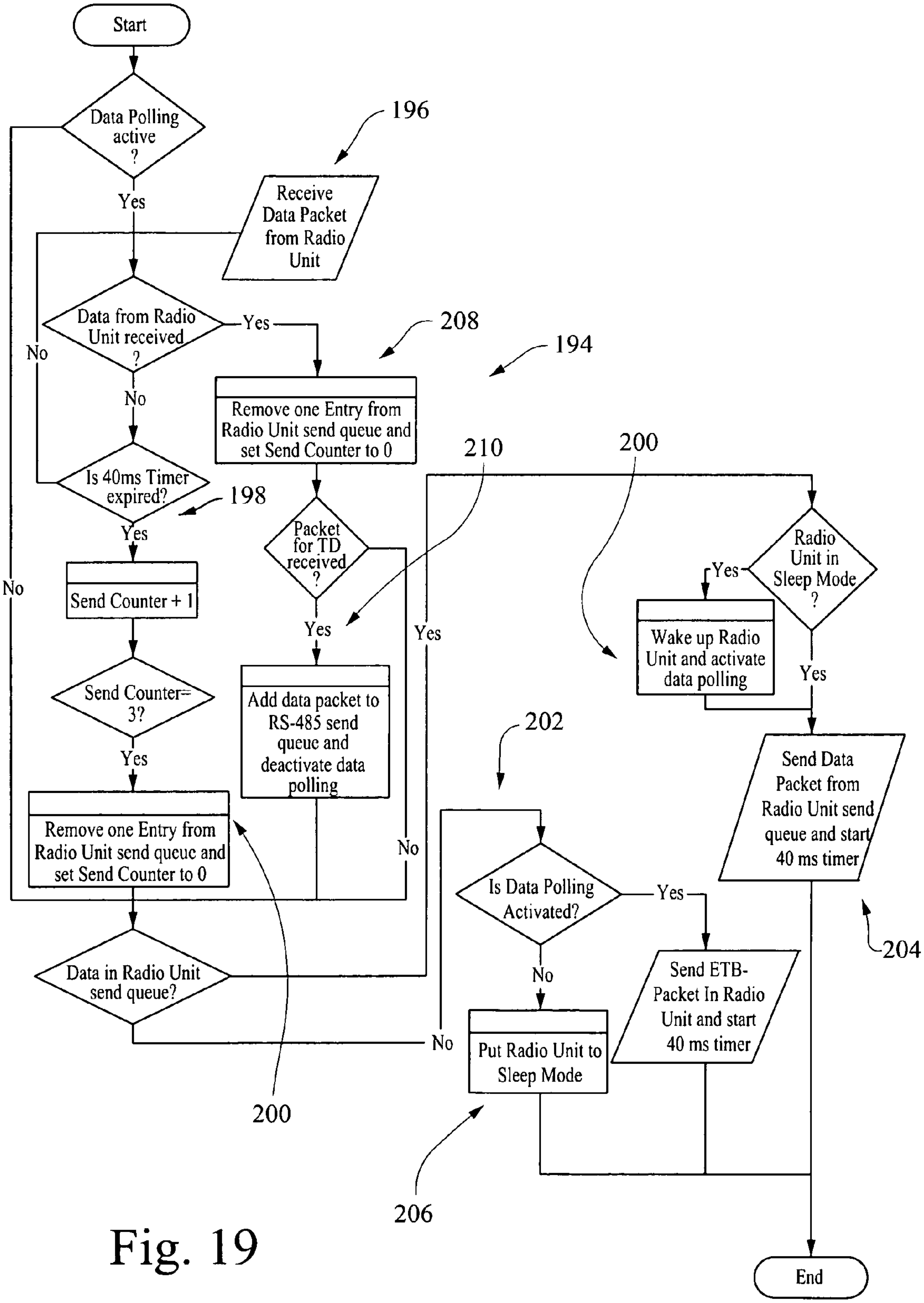
FIG. 19 is a flow chart for the wireless communication module in the machine interface device of FIGS. 1 and 2.

With reference now to FIGS. 1 and 19, wireless communications between the MID 36 and PID 40, as an alternative to RS485 communications described above, can he handled in both devices 36, 40 by a wireless communications module or routine 194. When the wireless data reception is started, the module monitors receipt of a data packet from the wireless radio frequency transceiver in the device 196. If a data packet is not received by this monitoring step and a timer expires, the send counter is incremented 198. If the resulting value of the send counter is three, an instruction is set to remove one entry from associated radio unit's send queue and send it, and the send counter is reset to zero 200. If data is in the radio units send queue, the radio unit is first awoken (if it is in sleep mode) and a data packet is sent by the radio unit from its send queue 202. If data is not in the send queue and data polling is activated, and ETB packet is sent to the radio unit and the timer is started 204. Otherwise, the radio unit is put into the sleep mode 206.

During the monitoring step 196, when a data packet is received from the radio unit in the device, one data entry is removed from the radio unit's send queue and the send counter is set to zero 208. If the data entry is addressed to the TID 34 of FIG. 1, the data packet is added to an RS485 send queue and data polling is deactivated 210 to save power at the battery driven PID 40 of FIG. 1. From there, the routine cycles back to the beginning and determine whether data polling is active 196.

In short, the wireless communication routine 194 of FIG. 19 manages radio communication to the PID 40. If no bonus game is running, the PID 40 is put into sleep mode. If a bonus game starts, the MID (which is the master with respect to the PID) 36 polls the PID (Slave) 40 until the buttons are pressed and activated on the PID 40. Then, the PID 40 is put to sleep again to save battery power.

Figure 20:
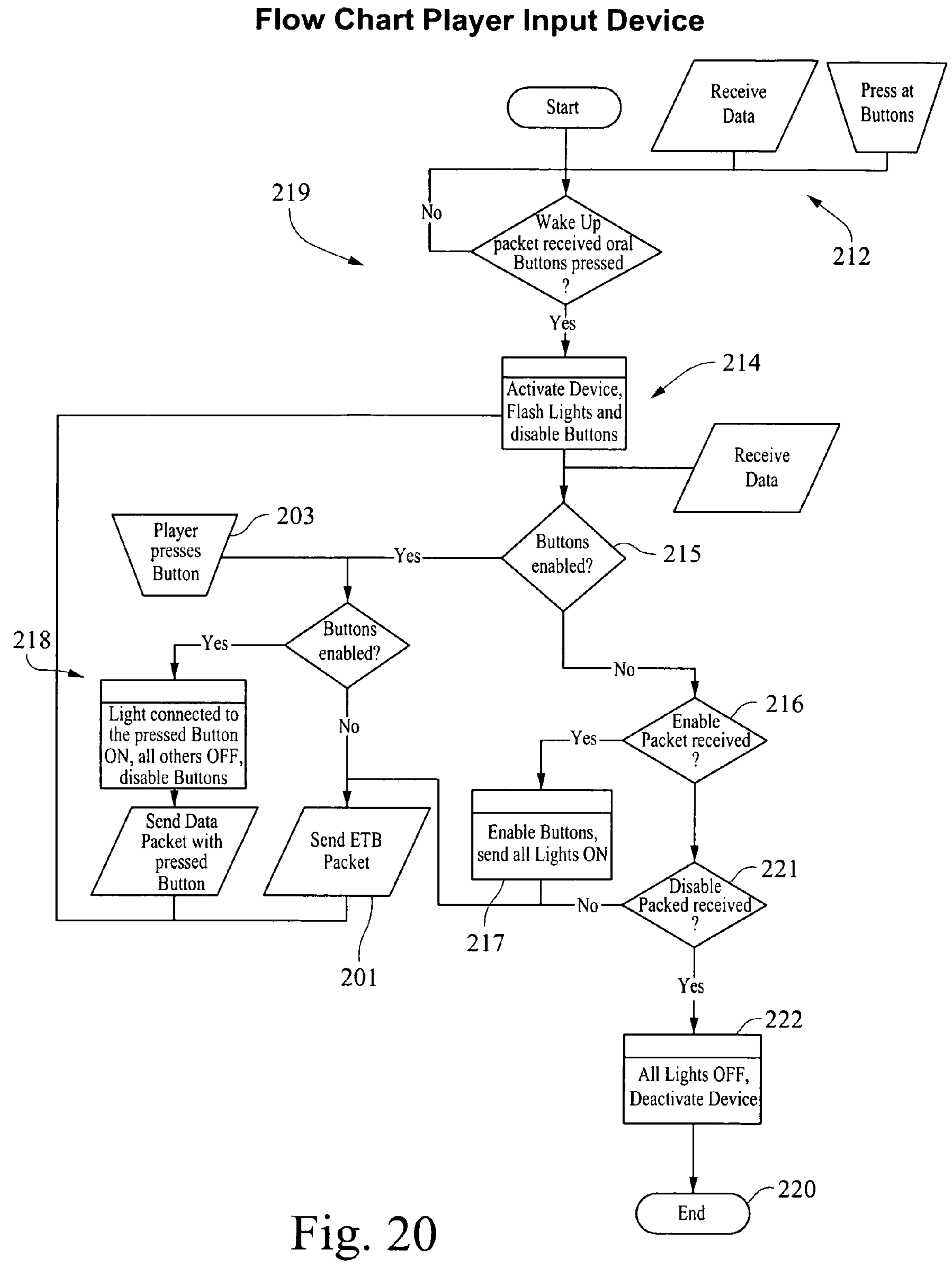
FIG. 20 is a flow chart for the player input device of FIGS. 1 and 2.

With reference now to FIGS. 1 and 20, the PID 40 operates upon start up 219 by monitoring for receipt of data through its wireless or wired interface and for the press of a button by a game player at the game table 212. When a wake-up data packet is received or a button on the PID 40 device is pressed, the PID 40 is activated, lights flash on the PID 40, and the input buttons are disabled 214. If the buttons on the PID 40 are disabled 215, the routine 20 proceeds to determine if an enable packet was received 216. If an enable packet has been received, the PID 40 buttons are enabled and lights are activated 217. If a button is then pressed 203, the light for that button remains on, the others turn off, and the PID 40 sends a packet identifying the pressed button 218. The start-up routine 219 cycles back to the button disabling step above 214.

If, on the other hand, an enable packet was not received 216 at the testing step above and a disable packet was received 221, the PID 40 is disabled 222. The start-up routine ends 220. If the enable packet was not received and a disable packet has not been received 221, then the start-up routine 219 proceeds to the send ETB packet step 201 and then cycles back to the disable buttons step 214.

Figure 21:
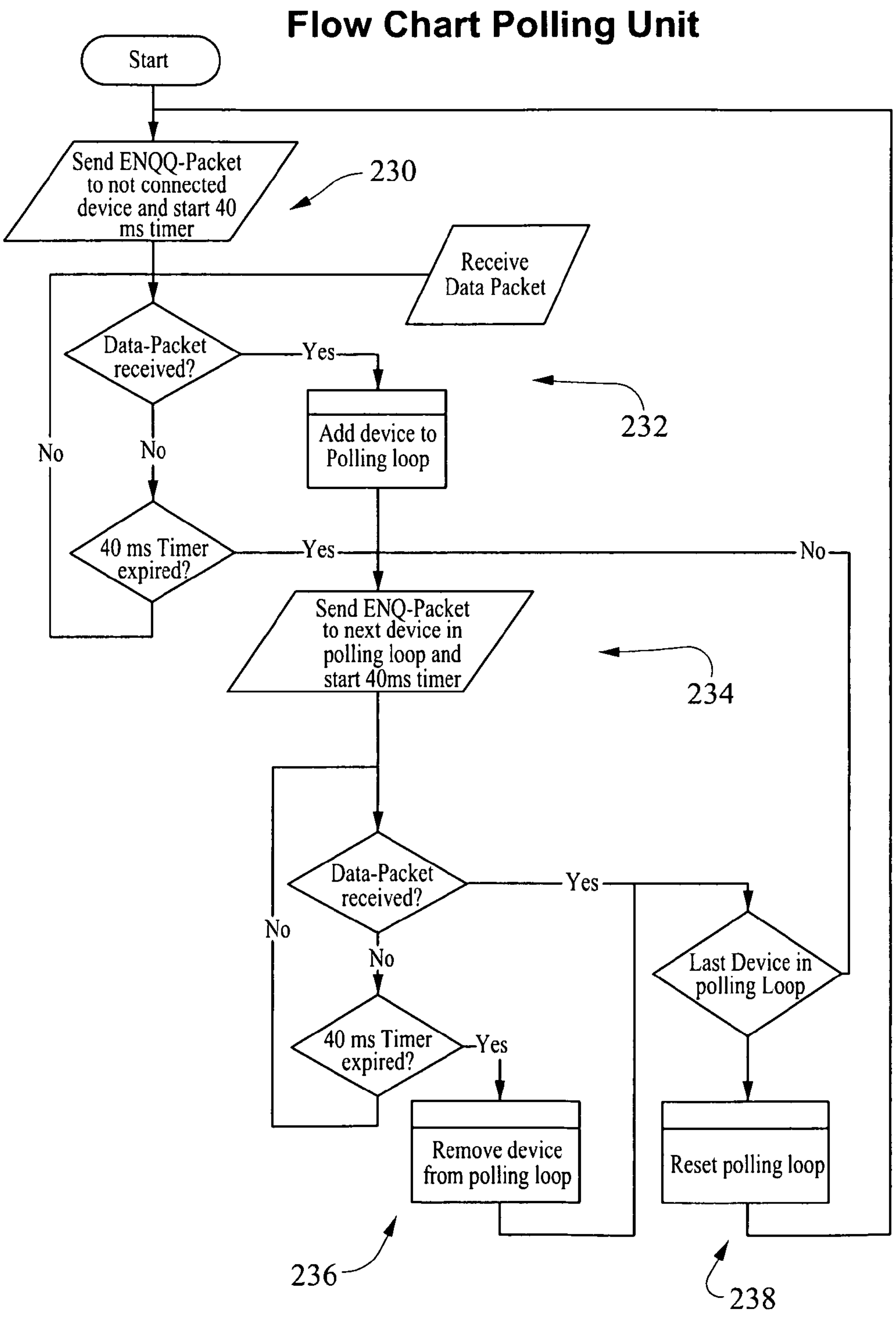
FIG. 21 is a flow chart for the polling unit of FIGS. 1 and 2 and the network manager shown in the alternative embodiment of FIGS. 11 and 12.

With reference next to FIGS. 1 and 21, the PU 28 operates upon start by sending and ENQ (enquiry) packet to any device not presently connected to the PU 28 and start a 40 millisecond timer 230. Upon receipt of a data packet at the PU 28 prior to the expiration of the timer, the device that sent the data packet is read from the packet and that device is added to the polling loop 232. After expiration of the timer, an ENQ packet is sent to the next device in the polling loop, and again the timer is started 234. If no responsive data packet arrives prior to the expiration of the timer, that particular device is removed from the polling loop 236. If a responsive data packet is received prior to expiration of the timer and the particular device is the last device in the polling loop, the polling loop is started again 238 as at startup 230. Otherwise, the polling loop reinitiates the portion of the loop in which an ENQ packet is sent to the next device in the polling loop and the timer is started again 234.

In sum, the PU 28 is a passive device and does not send data except ENQ packets. The PU 28 thus enables the other devices, such as the TID 34, TDD 26, and the MID 36, to communicate with each other by sending ENQ packets. If one such device receives an ENQ packet, the device can send a data packet to a separate addressed device, which then answers with an ETB packet if the separate addressed device received the data packet correctly. When the ETB packet is received, the PU 28 is informed that the communication is completed and the PU 28 has control over communications again. The PU 28 also resumes control if the 40 ms timer expires.

Now referring back to FIGS. 1 and 2, the preferred PPC2 16 runs a script engine which controls the appearance of all objects and media on the associated TDD 26. Script engines are well known to those skilled in the art. The script engine executes each command in the script in seriatim unless directed to do otherwise by the script commands. The script engine is called in the PPC2 16 by an associated scheduling module in the PPC2 16.

Commands in the script: (i) control graphics and video, including when, where, and how they appear on the screen of the associated TDD 26; (ii) send instructions in response to polling from the polling unit 28 that a particular script has been executed; (iii) instruct one script to run another or to repeat a script; and (iv) instruct a script to await completion of tasks called by the script engine, such as running of an MPEG video or other media. In the event that the script being run is not a bonus script, the script engine sets a flag to ignore all other commands in the script upon execution of a command to play live video. On the next call to handle the script, the engine will hide all objects except the ticker and live video modules. While this flag remains set, the script engine processes only ticker and control commands—all other graphics objects are ignored. In the event that the script being run is a bonus script, however, the script engine continues to execute all the commands in the script.

The script engine thus can call and execute a variety of other modules including an MPEG video playing module, a live video playing module, a TV tuner module, a bitmap graphics module, a ticker tape graphics module, a serial port module, a network communications module, and a scheduler module.

The MPEG video playing module utilizes the capabilities of the Sigma Designs Netstream 2000 card in the PPC2 16. This card provides hardware MPEG decoding, scaling of MPEG video, and an analog chroma key overlay, as described above.

The Netstream 2000 card is controlled using the Windows Direct Media function calls. A direct show filter opens an identified MPEG file, loads it, and then buffers and streams the MPEG data to the Netstream 2000 card. The Direct Show filter thus starts MPEG files as instructed to do so and streams the data to the Netstream 2000 card so that the scheduling of MPEG data to the Netstream 2000 card is transparent to the Netstream 2000 card. The filter issues a notification to the PPC2 16 scripting system when a given MPEG video is nearly finished.

When the MPEG video playing module is not running, the main scripting application mutes the audio output to the Aux and Line-out outputs on the motherboard. Conversely, this muting is turned off when this module is executing and running an MPEG video.

The live video playing module utilizes the capabilities of the Mutech IV-410 card. This card can capture composite video for display on an associated TDD using an analog chroma key as noted above. This card also provides a VGA adapter and is controlled by a Mutech SDK.

The Mutech card does not have audio output input. Audio from a video source for this card is run into the line-in channel on the motherboard in a fashion well known to those skilled in the art, and the Mutech card turns off audio muting for its video source when it is providing video to the system.

The TV tuner module controls the 232-STA TV tuner, which connects to the PPC2 16 through a serial RS 232 null modem cable. The tuning module controls and responds to the buttons on the front panel of the 232-STA TV tuner and audio output settings for it. This module also controls channel changes for video sources to the 232-STA TV tuner.

Alternatively, the PPC2 16 may employ a Hauppauge WinTV card and live video module. This alternative WinTV card is controlled by the Hauppauge OCX control and SDK.

The bitmap graphics module opens bitmap files and displays them on the associated TDD 26. This module creates a child window and identification number for each bitmap graphics object. This identification number is then utilized by the script engine in calling the associated bitmap for display by the bitmap graphics module.

The bitmap graphics module can scale an image, draw boarders around the image, label the image, and allow it to be overlaid on an MPEG video or live video stream being displayed on the associated TDD. This is accomplished by the chroma key color scheme described above.

The ticker tape graphics module displays and scrolls text banners (on the associated TDD 26) created with Windows fonts and images. The text for a given text banner is provided by an ASCII stream stored in an internal buffer. The ASCII stream can be passed to this module either as a text file or as a stream from an external source.

The banner text stream may also include special tags. These tags can contain instructions to change the font parameters for displaying the associated text characters, such as font size, color, font typeface, bolding, italics, and underlining. If a particular font that is specified for given text is not a resident Windows font, this module provides a default font.

Another special tag can insert an image into the banner display. The image tag specifies the location of the image file and its size. The image file is a bitmap file.

In order to minimize drawing time required by this module, a memory device-context (DC) is used. The memory DC is not as wide as the screen area but is twice as high. A sliding window method is implemented to draw from the memory DC to the TDD 26 screen in a fashion well known to those skilled in the art in order to stream the banner text across the TDD 26 screen.

The script engine on the PPC2 16 calls this ticker graphics module along with commands in the script for the appearance characteristics for the ticker to be displayed by the module. These characteristics include screen position, boarder size, background color, border color, etc.

As noted above, the serial port module on the PPC2 16 monitors the RS 485 port for packets addressed to the PPC2 16 and sends messages out the RS 485 port on the PPC2 16. When this module receives a polling packet, it checks its send message queue for the next packet to be sent. If there is message to send in the queue, this module creates and sends packets encapsulating the message. If is no such message, this module responds with an ETB packet.

If this module receives a valid packet for the PPC2 other than a polling packet, this module passes the packet to the main software module of the application. The main software module then determines which module should process the packet. If the packet requires a response, the main software module generates the response and forward the response to this serial port module for transmission of the packet.

Thus, if a TV channel command is received, the main software module calls the 232-STA TV tuner module to change the channel as instructed by the command. If a set audio level command is received, the main software module will set the audio level for the channel specified in the packet.

The main software module will call the script engine with a change script command is received from the TID. The script engine then will to locate the script in the command list, such as the attract mode script, the bonus script, and the outcome script.

On occasion, the PPC2 16 will receive packets from an associated TID for the associated TMS 12. The serial port module forwards these types of packets to the network communications module for forwarding of these packets to the TMS 12.

The network communication module establishes and manages and Ethernet TCP/IP connection of the PPC2 16 to the associated TMS 12 and connect This module also connects to a UDP Multicast socket on the TMS 12 and accomplished file transfer according to the TCP/IP and UDP Multicast protocols in a fashion well known to those skilled in the art.

When an operator requests scheduling of a media block on the TMS, this module, which also runs on the TMS 12, sends a message to the PPC2 16 to determine if the involved media files are present on the PPC2 16. If the files are present, this module sends the schedule file for the files to the PPC2 16. If they are not, this module transfers the needed media files and then transfers the schedule for them to the PPC2 16. This scheduling information includes the start time, the start date, the end time, the end date, media block file names, and play code to indicate if the media files should be replayed daily, weekly, monthly, etc.

The scheduler module maintains a list of scheduled media blocks for the PPC2 16. This list consists of text file stored on the hard drive for the PPC2 16. This module checks the block list every minute and determines if a different attract block should be played. Is so and the block's "Attract" script is on the PPC2's hard disk, this module calls the script engine and passes the path for the block script file to the script engine. If there is no block scheduled for the current time, this module calls a default attract script and executes that script.

The PPC2 16 hard disk has a root directory containing folders for the scripts and associate ini.files, applications programs, the text banners, MPEG videos, and image bitmaps. The root directory also contains bonus script text, a default script and ini file, a scheduler text file, and the bonus MPEG video file.

II. Multi-table, Network Table Game Video System

Figure 5:
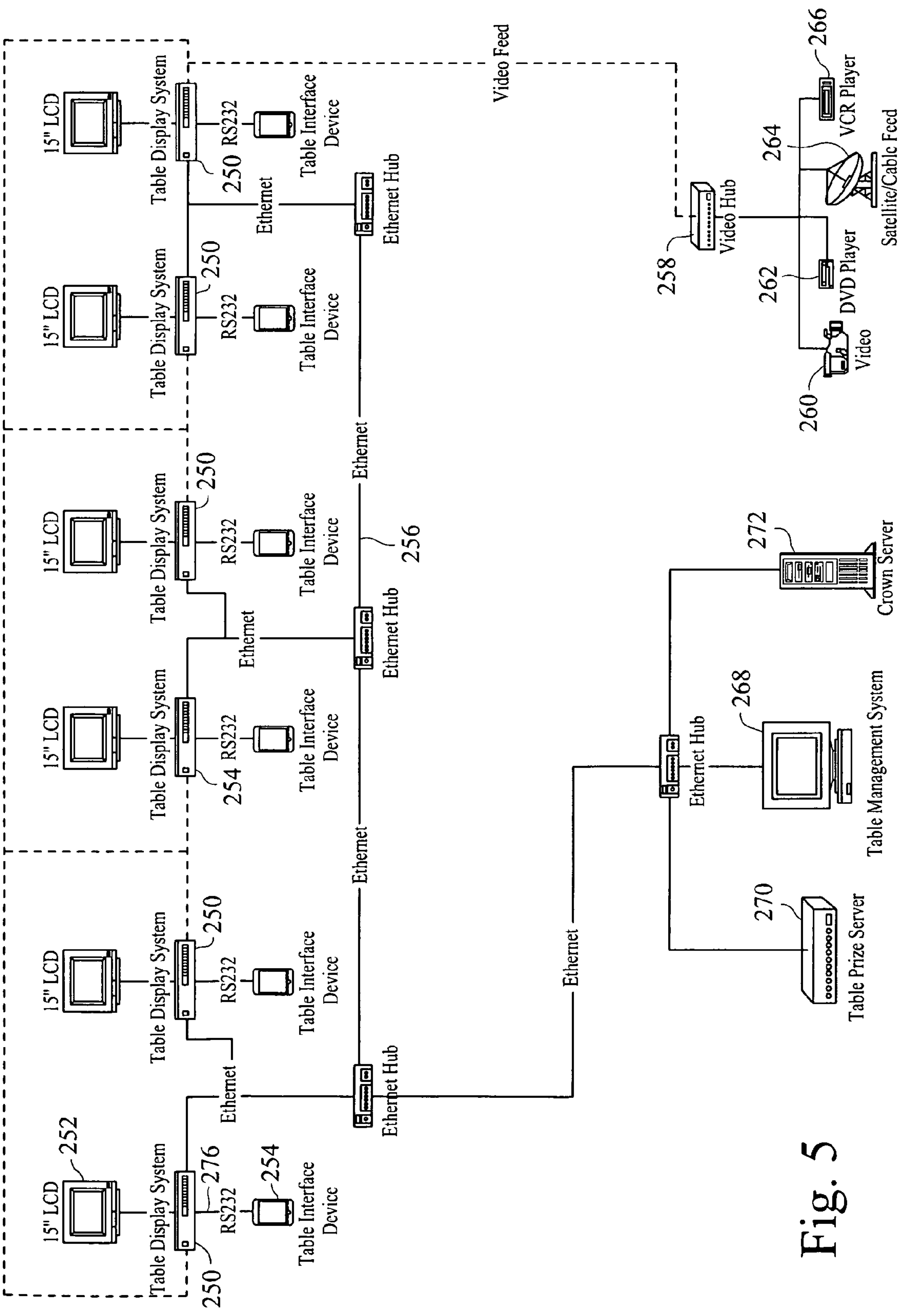
FIG. 5 is a schematic network diagram of the networked video table game system of FIG. 4.
Figure 6:
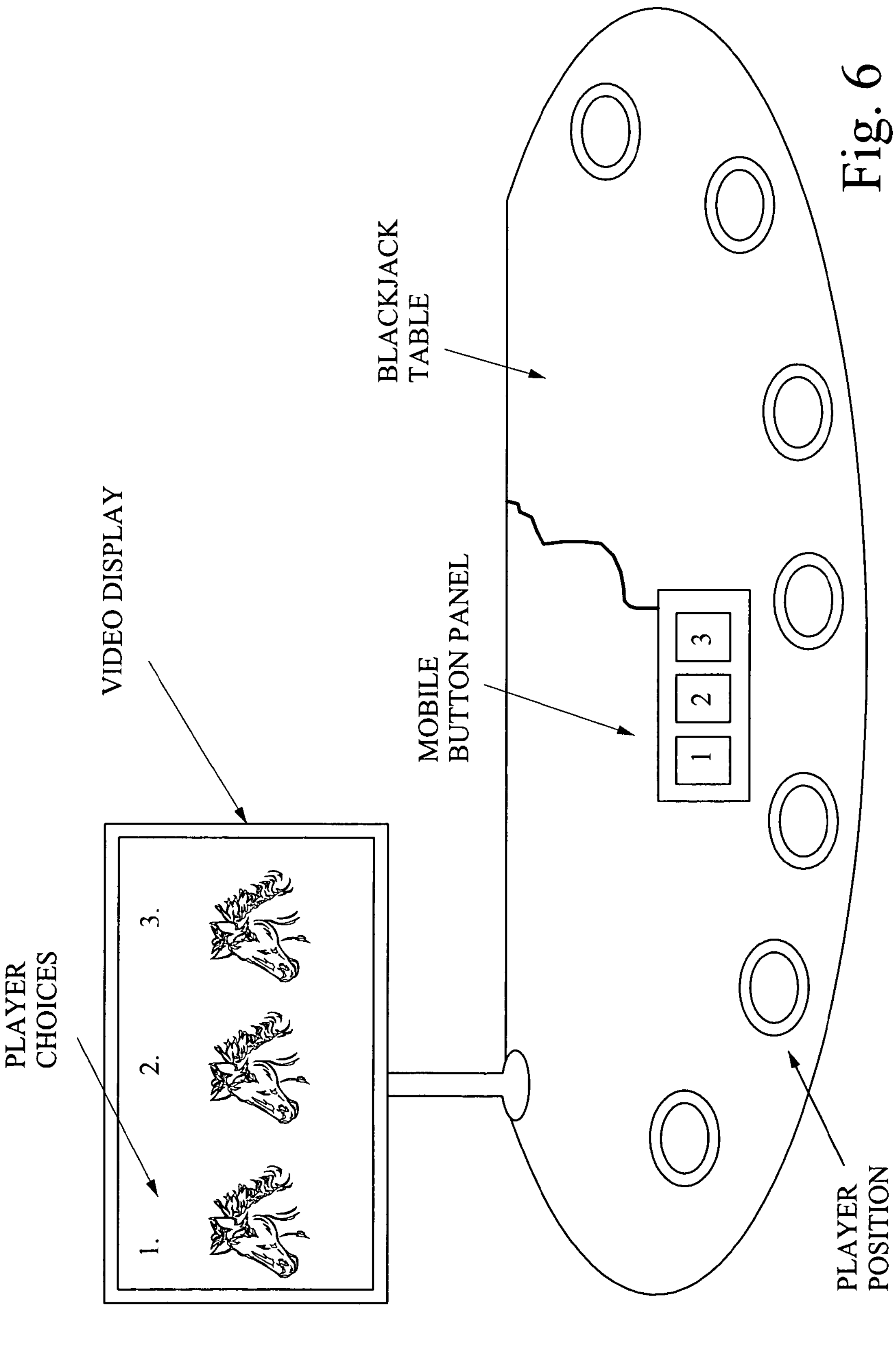
FIG. 6 is a schematic view of the gaming table in the present video table game system, showing a variety of character options from which a player may select one character to participate in a bonus video game.
Figure 7:
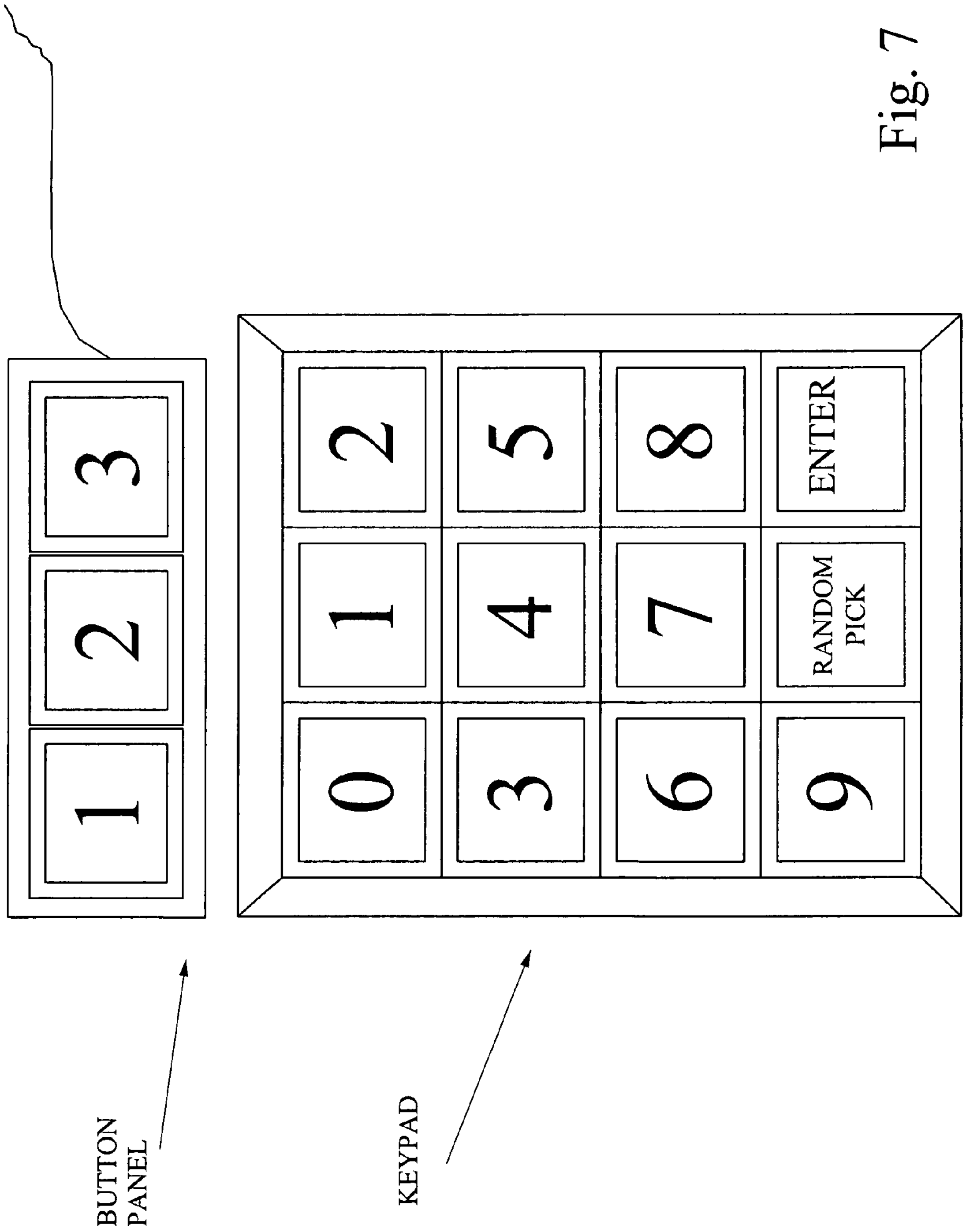
FIG. 7 is a schematic view of an alternative input keypad embodiment for a player interface or input device at a game table.

With reference now to FIG. 5, one embodiment of the multi-table networked game video system consists of a number of table display systems 250—preferably one such table display system, e.g., 250, for every game table (not shown) in the network. Each such system, e.g., 250, supports an associated 15 inch LCD table display device, e.g., TDD 252, a high quality sound system mounted at the associated game table not shown, and an associated table interface device, e.g., 254, in communication with such system 250 through either wired or wireless lines. Each such system, e.g., 250, is connected to a preferably high speed Ethernet LAN or WAN (local or wide area network) 256. The preferred table display system, e.g., 250, is preferably a Pentium III or IV personal computer with conventional but high quality Ethernet support, MPEG and digital video and audio processing capabilities, serial communication ports, and digital data storage and RAM.

The LAN or WAN 256 includes and supports a video and audio server or hub 258, which supports VCRs 260, DVD players 262, satellite or cable feeds 264, VCR players 266, or other sources of video or audio. The server 258 combines these video inputs and distributes them via standard coax cable to each TDS's (e.g., 250) TV tuner card, and the TDS then distributes selected video channels or content to the associated TDD 252.

The LAN or WAN 256 also supports a table management system 268, a table prize server 270, and a Crown Data server 272. The table management system 268 manages the overall network 256 and its various components in coordination with the connected table display systems, e.g., 250. The table management system 268 is also preferably a powerful Pentium III or IV LAN server with conventional but high quality Ethernet support, MPEG and digital video and audio processing capabilities, serial communication ports, and digital data storage and RAM.

Figure 4:
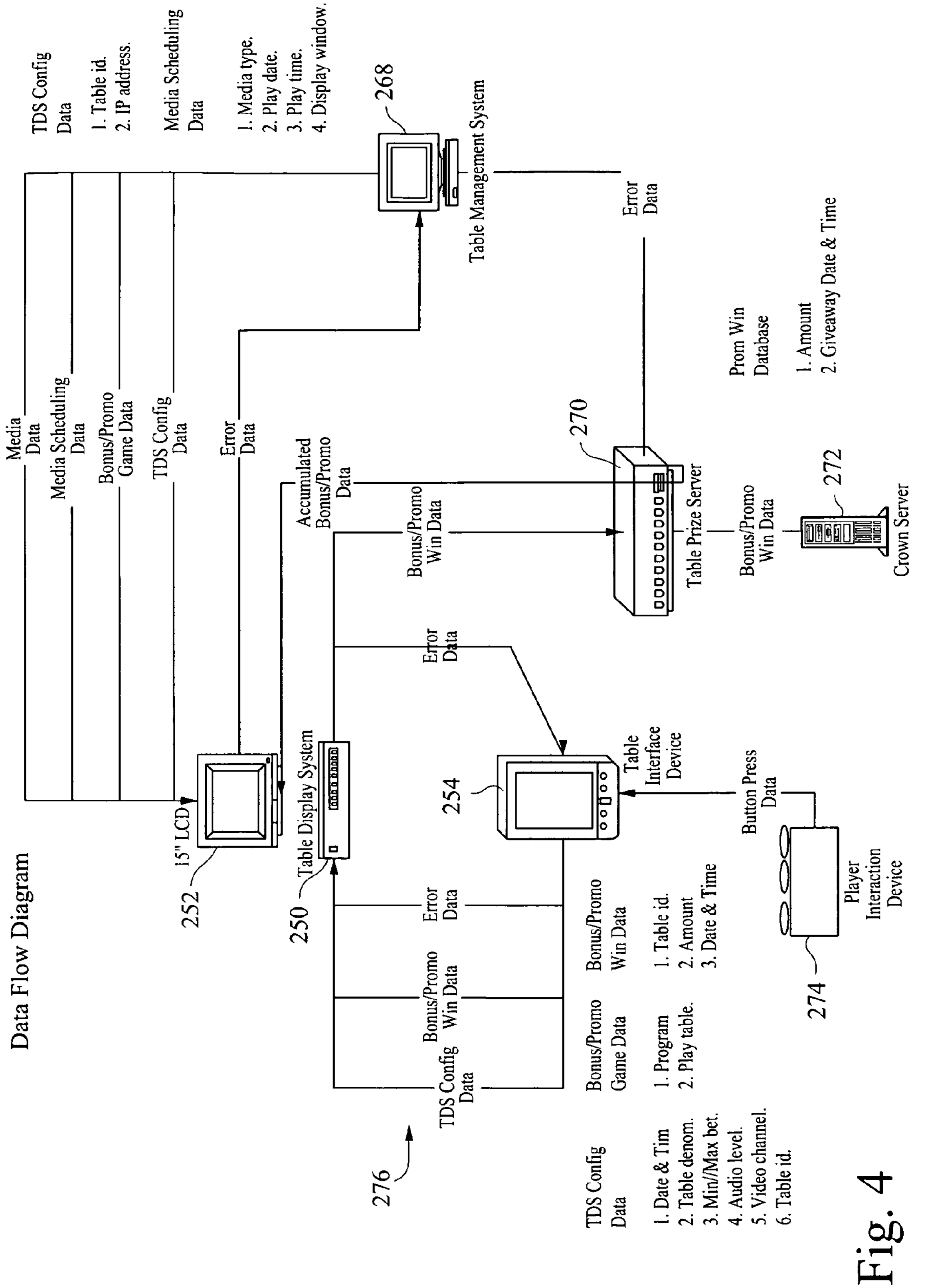
FIG. 4 is a schematic data flow diagram of a multi-table networked embodiment of the present video table game system.

With reference now to FIG. 4, the table display system 250 in the networked embodiment provides, in one box such as shown in the alternative embodiments of the table display controller 68 of FIGS. 11 and 12, much, but not all, of the functionality of, as shown in FIG. 1, the PPC2 16, the polling unit 28, and the machine interface device 36. The table display system 250 is in RS 232 communication 276 with the associated table interface device 254, and the table interface device 254 is in communication with an associated player interactive device 274. Through the RS 232 communication line 276, the table display system 250 exchanges with the table interface device 254: (i) table display device configuration data (including date and time, game table money or betting denominations, minimum and maximum bet amount, audio level, video channel, and game table identification); (ii) bonus/promotion player win data (table identification, win amount, and date and time of the win); (iii) error data; and (iv) bonus/promotion game play data (including game or promotional program and associate pay table). In turn, through wired or wireless communication, the table interface device 254 exchanges button press (game player selection) data with the player interface or interaction device 274.

The table display system 250 supports the associated LCD 252 in order to allow the LCD 252 to receive from the table management system 268 (and through the table management system 268, the LAN or WAN 256 of FIG. 5): (i) multimedia data; (ii) media scheduling data; (ii) bonus/promotion game data; (iii) error data; and (iv) table display device (LCD 252) configuration data. The LCD configuration data includes the identification data for the associated gaming table and the IP address of the LCD 252 on the LAN or WAN 256 of FIG. 5. The media scheduling data includes media type, play date, play time, and display window for displaying selected media on the LCD screen 252.

The table display system 250 also supports the LCD 252 to allow the LCD 252 to receive and display accumulated bonus/promotion game data from the table prize server 270 via the LAN or WAN ("network") shown in FIG. 4. The table display system 250 also exchanges bonus/promotion win data with the table prize server 270 over the network 256.

In turn, through the network the table prize server 270 exchanges: (i) bonus/promotion win data with the Crown Data server 272; and (ii) bonus/promotion win data with the table management system 268. This win data includes data regarding player win amounts and promotional giveaway dates and times.

Now referring to both FIGS. 4 and 5, the table management system ("TMS") 268 utilizes a standard relational database (such as SQL Server), Microsoft NT 4.0, and an Ultra Suite GUI Development Tool Set. It includes additional TMS applications system software, preferably written in C++ JAVA, providing bonus game, promotional and advertising, and video and audio, and accounting functionality.

Figure 26:
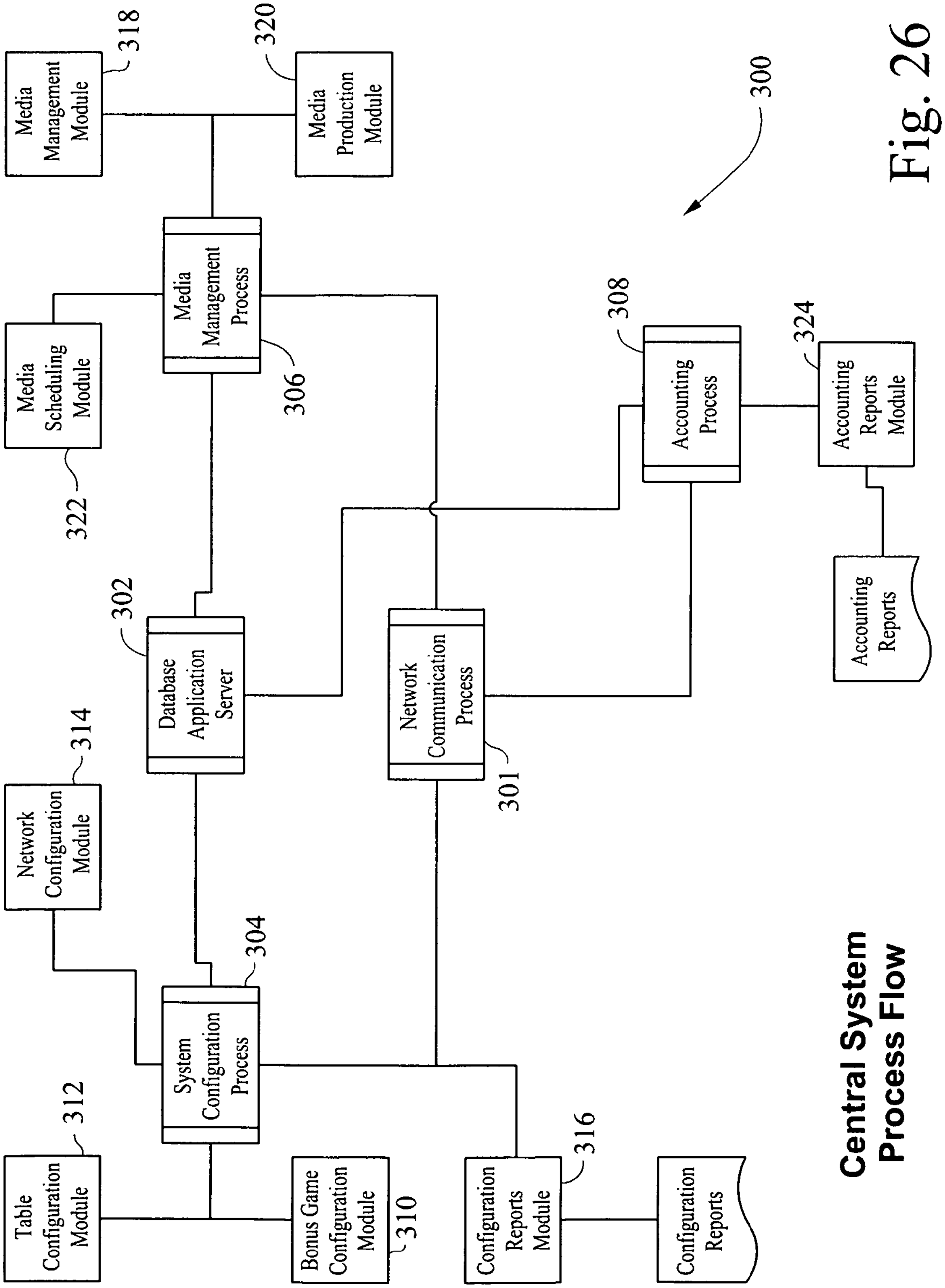
FIG. 26 is a flow chart of the software modules running on the table management system computer shown in FIG. 4.

As shown in FIG. 26, the TMS applications system, generally 300 thus provides network communications process 301, the database application server (SQL Server) 302, system configuration process 304, media management process 306, and accounting process 308. The system configuration process 304 includes a bonus game configuration module 310, a table device configuration module 312, a network configuration module 314, and a configuration reports module 316. The media management process 306 includes a media management module 318, a media production module 320, and a media scheduling module 322. The accounting process 308 includes an accounting reports module 324. This same basic TMS applications system configuration may also be implemented on the stand-alone system with the TDC 68 of FIGS. 11 and 12 shown above.

The network communications process or module 301 provides the communication link between the processes that take place on, as shown in FIGS. 4 and 5, the TMS 268 and the other devices, e.g., the TDS 250 and the TPS 270, on the network 256. Referring now to FIGS. 4, 5, and 26, the network communications module 301 interfaces directly with all these other devices and provides a single transparent communications transport and interface for all the communications on the network 256.

The bonus game configuration module 310 manages the storage of data, in the database application server 302, relating to bonus games associated with the system. This includes bonus game software, pay tables for bonus games, and video and graphics that are associated with a given bonus game. In some jurisdictions, pay table and corresponding media may then be identified and downloaded to an appropriate TDS 250 when the operator or dealer wants to change the bonus games. In other jurisdictions, however, this type of information and media may be maintained on the game table's TDS 250. Preferably, the bonus game configuration module 310 is readily adaptable to the requirements of the jurisdiction.

The bonus game configuration module 310 also provides the following functions: (i) querying of the table display system 250 for current bonus game information including an identification of the loaded bonus game and its associated pay table(s); (ii) defining which bonus games are available and active for each game table (not shown in FIG. 4 5, or 26); (iii) defining the available and active pay tables for the game(s); (iv) turning video or audio on or off at given game tables; and (v) assigning channels for real time display on LCD's, e.g., 252, on the network.

The table device configuration module manages the registration of each of the network devices into the central database application server 302. In addition to the network devices shown in FIGS. 4 and 5, other such network devices can include network printers, gaming establishment signage, etc. Registration information for a network device also includes device location, IP address, hardware type, and software versions. Whenever network device configuration data changes, the table device configuration module sends the new data out over the network to the corresponding network devices for update.

The network configuration module 314 manages the relationships between the network devices, the connections between network devices, and the data paths for data from one network device to another.

The network configuration report module 316 allows a network system operator to create reports about the network and data stored in the database application server 302. This module 316 also allows the operator to generate graphic views of the network and the relationships between network devices.

Figure 24:
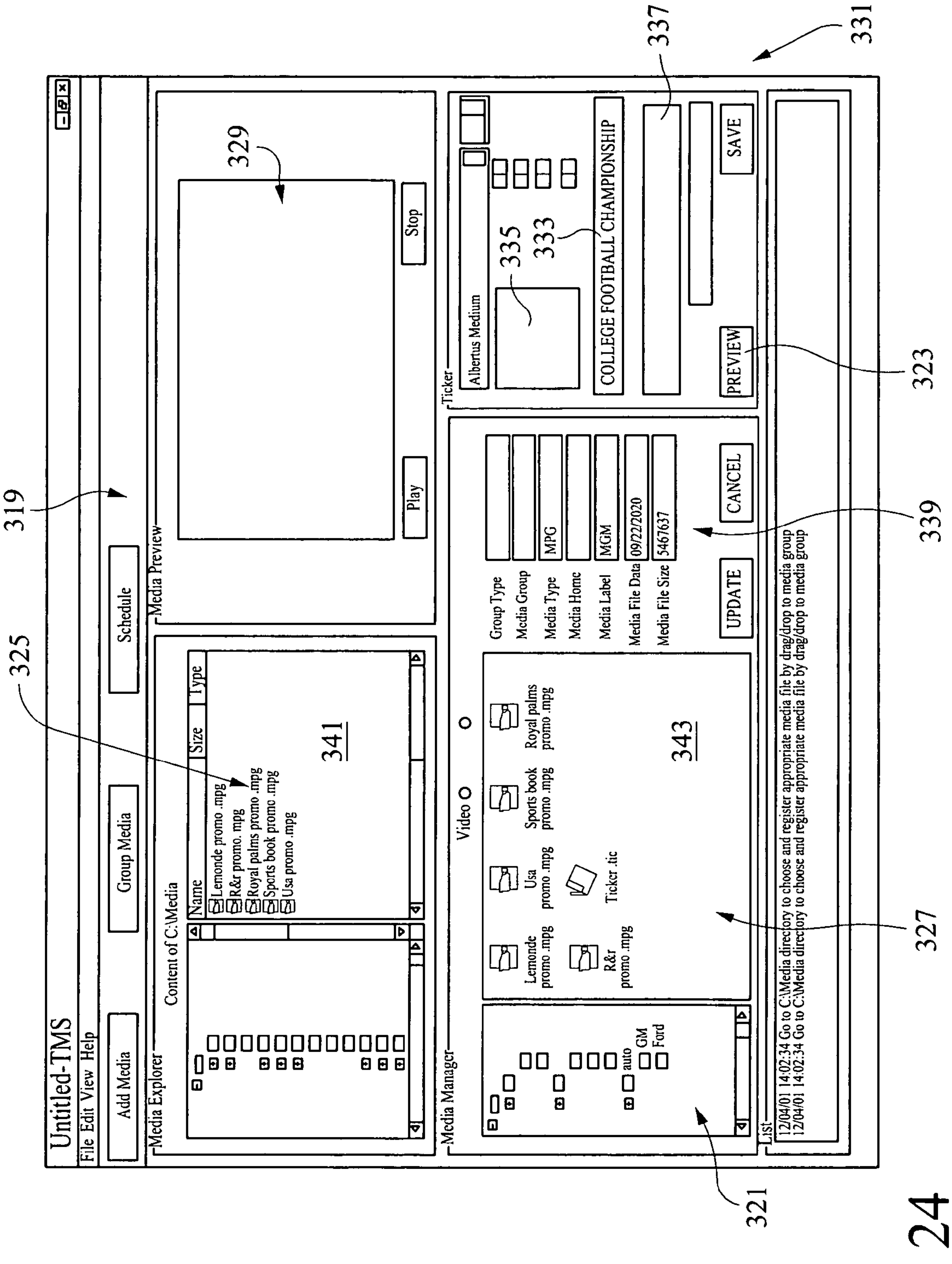
FIG. 24 is a third screen display on the table management system in order to control the video and text content shown on the LCD of FIGS. 1 and 2.

The media management module 318 provides, as shown in FIG. 24, a user interface 319 for registration of media and multimedia into the database application server 302. This module 318 supports medial in a wide variety of formats, including MPEG, JPEG, WAV, AVI, and others, and a wide variety of data storage and I/O devices, such as floppy drives, hard drives, CDROM, and DVD. The operator defines media groups or types, generally 321, in the database application server 302. One example would establish a group type "Auto" with subgroups for "GM" and "Ford."

The media management module 318 allows an operator to preview media through a simultaneously preview sub-window 329. The module 318 provides a media manager sub-window 341 and media explorer sub-window 343 which cooperatively allow the operator to drag and drop a media icon, e.g., 325, for a given media file into a desired group type, e.g., 327, in the media manager sub-window 341, thereby placing that media file 325 in that group 327.

The media management module 318 also provides a ticker sub-window interface, generally 331, for the creation of ticker type messaging, such as that seen on cable news networks. Through this interface 331, the operator may input text 333 and image tickers 335 in a variety of colors and fonts and store the ticker messages and associated data 337 in the database application server 302. This interface 331 also allows users to preview tickers in a ticker preview window 323.

The media management module also provides a selected media file information sub-window 339. This sub-window 339 displays the media file information and allows the user to update the information and data structure reflected by the media manager sub-window 341.

Figure 23:
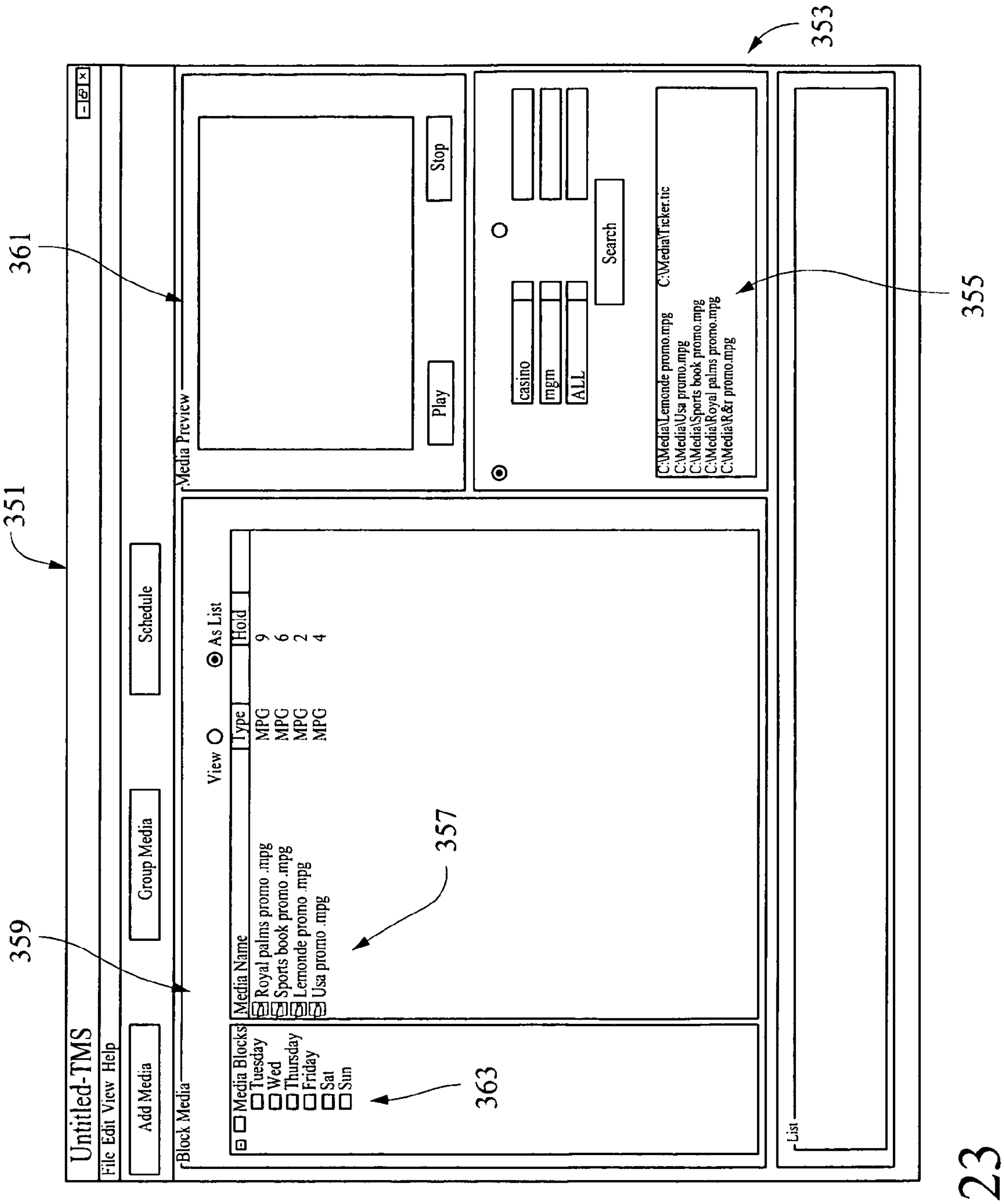
FIG. 23 is a second screen display on the table management system in order to control the video and text content shown on the LCD of FIGS. 1 and 2.

The media production module 320 provides, as shown in FIG. 23, a window interface 351 for generating media blocks (groupings), play lists for each block, and play schedules for the listed media from the central database application server 302. This interface allows the operator to search and sort media in the central database through a search sub-window 353, and then drag and drop resulting media 355 into a play list 357 for an associated media block (schedule grouping, e.g., day of the week) 363 on a block media sub-window 359. The play list can then be rearranged and media elements in the list can be previewed in the preview sub-window 361. Play lists can then be stored in the central database on the associated TMS.

Figure 22:
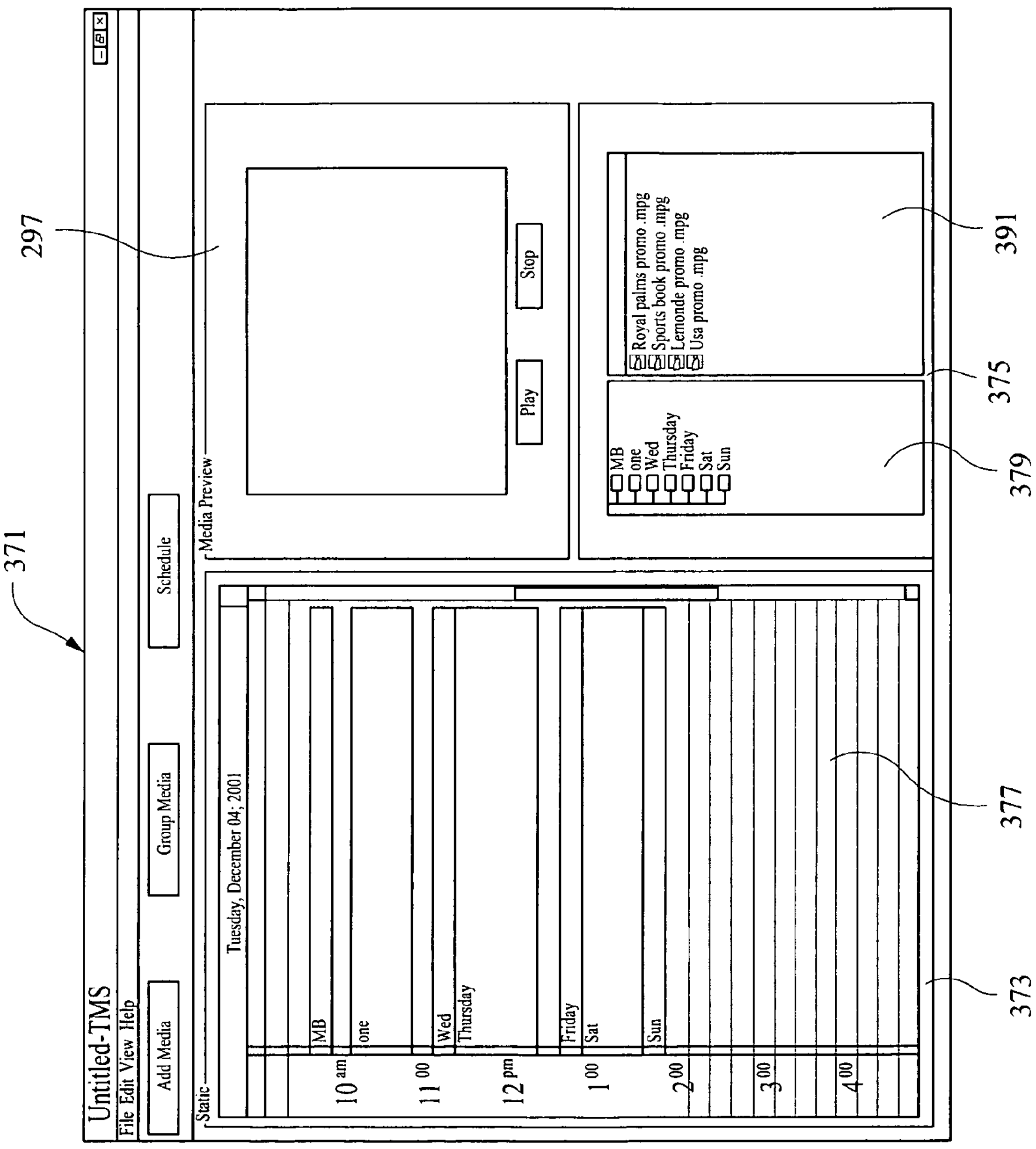
FIG. 22 is a first screen display on the table management system in order to control the video and text content shown on the LCD of FIGS. 1 and 2.

The media scheduling module 322 provides, as shown in FIG. 22, another window 371 that allows the operator to select, as shown in FIG. 5, a particular compatible device, such as TDD 252, and schedule a play list for play on that device. The media scheduling module 322 has a scheduling sub-window 373 with a calendar 377 and a media block sub-window 375 with the available media blocks 379 and play list 391 for a selected media block. Through the calendar 377, the operator selects the year, month, day, and time, and drags and drops a block or individual media file into the desired time slot on the calendar 377. The operator may also preview selected media files in a preview sub-window 397 in the scheduling window 371. When the operator has completed the schedule, the media scheduling module 322 transmits the schedule to applicable devices on the network.

Referring now to FIG. 26, the accounting process provides a window interface for an operator to generate system and network reports from data stored in the central database. The operator can select data to be reported and a wide range or search of sort criteria in order to gather system and network data and then view or print the resulting, report.

With reference now to FIGS. 4 and 4, each table display system, e.g., 250, runs Microsoft Windows NT and C++ software modules providing the startup, TMS interface, TID interface, background task handling, and TDD display functionality. The startup functionality includes: (i) queries to the TMS 268 to determine if the table display system 250 is known to the network 256; (ii) if not known to the network 256, asking the TID 254 for a node identification and forwarding that identification to the TMS 268, which marries the node identification to an IP address and forwards that address to the TDS 250; (iii) loading of animations from the TDS 250 CDROM drive onto the TMS 250 hard disk drive, hashing the animations, and verifying their authenticity; and (iv) downloading the current bonus game software from the table prize server (TPS) 270 and verifying the authenticity of the downloaded game software.

The TMS interface software performs the following functions: (i) monitoring the network for messages from the TPS 270 and the TMS 268; (ii) receiving table configuration information from the TMS 268 and relaying it to the TID 254 when requested; (iii) receiving video bonus game information from the TMS 268 and relaying it to the TID 254 when requested; (iv) receiving promotional video game information from the TMS 268 and relaying it to the TID 254 when requested; (v) receiving video, audio, or data entertainment, promotional, and advertising media and storing it on a specific hard disk drive partition on the TDS 250; (vi) receiving entertainment, promotional, and advertising scheduling information and incorporating it into the current schedule; and (vii) receiving promotional data and relaying it to the TID 254.

The TID 254 interface software performs the following functions: (i) using a serial protocol for communications (any of a wide variety of such serial protocols will work equally well and are well known to, or easily implemented by, those of skill in the art); (ii) monitoring the RS 232 channel in the TDS 250 for requests from the TID 254; (iii) relaying bonus win and error data from the TID 254 to the TMS 268; and (iv) executing a bonus event for a TID 254 and its associated game table when triggered from the TID 254.

The background task handling software provides the following functions: (i) receiving game table configuration information and relaying it to the TID 254 for the game table; (ii) receiving promotional and advertising media and store it on a specific TDS hard disk 250 partition; and (iii) receiving promotional and advertising scheduling data and incorporating into the current schedule on the TDS 250.

The TDD 252 display functionality software provides the following functions: (i) displaying of bonus win data across the bottom of the TDD 252 in a ticker tape fashion; (ii) activating a special bonus win event at the associated game table when a bonus threshold message is received from the table prize server (TPS) 270; (iii) displaying or playing of bonus, promotional, or advertising multimedia on the TDD 252 (and associated sound system) according to the schedule on the TDS 250; (iv) creating and displaying image windows in real time on the TDD 252 based on bonus, promotional, or advertising configuration data on the TDS 250; and (v) running an attract mode video display on the TDD 252 when the associated game table is idle.

Each TID 254 runs software providing the startup, user interface, PID interface, TDS interface, promotional bonus game, and side wager bonus game functionality. The startup software provides the following functions: (i) verifying authenticity of the program currently loaded on the TID 254; (ii) if the present startup is the first startup since program download, sending RNG data packet to the associated TDS 250; and (iii) establishing communications with the TDS 250, and if unable to do so, notifying the user with visible and audible alarms from the TID 254.

The user interface software provides the following functionality: (i) touch screen interface for the TID 254; (ii) large buttons on the TID touch screen interface; (iii) user functions for setting date and time on the TID 254, which are then send to the TDS 250 so it can reset its clock according to the date and time data received from the TID 254; (iv) user function to set the game table identification, which, along with the IP address for the TIDS 254, is sent to the TMS 268; (v) user function to set the monetary denomination and the minimum and maximum bets, which are then sent to the TDS 250 for display on the LCD 252; (vi) user function to view recent bonus and promotional payouts on the associated game table; (vii) user function to set the video channel on the TDS 250; (viii) user function to set the audio volume on the TDS's associated sound system 250; and (ix) user function to configure parameters for the TDS 250.

The PID interface software provides the following functions: (i) wireless communication between the PID 274 and TID 254, with the TID 254 being the master and the PID 274 being the slave; (ii) secure communication; (iii) detection of button press, thereby triggering bonus events; and (iv) turning lights on and off.

The TDS interface software provides the following functions: (i) RS 232 communications between the TID 254 and TDS 250, in which the TID 254 is the master and the TDS 250 is the slave; (ii) providing TDS 250 configuration data, live video configuration data, and bonus/promotional game data updates in response to requests from the TID 254; (iii) receiving and processing of bonus event display requests from the TID 254; and (iv) relaying of bonus/promotional win amounts from the TID 254 to the TPS 270.

The promotional bonus game software provides the following functions: (i) upon game player qualification for bonus event at a game table and the dealer's pressing of the "Start" button on the TID 254, causing the TID 254 to request identification of a promotional prize on the TPS 270; (ii) when the TID 254 then receives the promotional prize response from the TPS 270, evaluating the response to determine if the response is a winner and identify the appropriate bonus game; (iii) sending of an activation request to the PID 274 and starting bonus request to the TDS 250 (for activation of the bonus game video on the associated TDD LCD 252; and (iv) receiving button response (due to player pressing of a selected PID button) from the PID and forwarding the response to the TDS 250 so that the TDS 250 then causes the TDD 252 to display the promotional bonus outcome.

The side wager game software provides the following functions: (i) when (a) a player bets an additional side wager to play a bonus game, (b) a player qualifies to play the bonus game, and (c) the dealer presses the "Start Bonus" button on the TID 254, sending commands to the PID 274 to activate its lights; (ii) receiving button press data from the PID 274, and (iii) sending button press data to the TDS 250, so that the TDS 250 then causes the side wager bonus outcome to be displayed on the associated TDD 252.

The PID 274 interface software provided the following functions: (i) secure wireless communications between the PID 274 (slave) and the TID 254 (master); (ii) detecting of button press on the PID 274; and (iii) sending button press data to TID 254 in response to next poll received from TID 254.

III. Additional Aspects of Systems and Methods of Use

Figure 8:
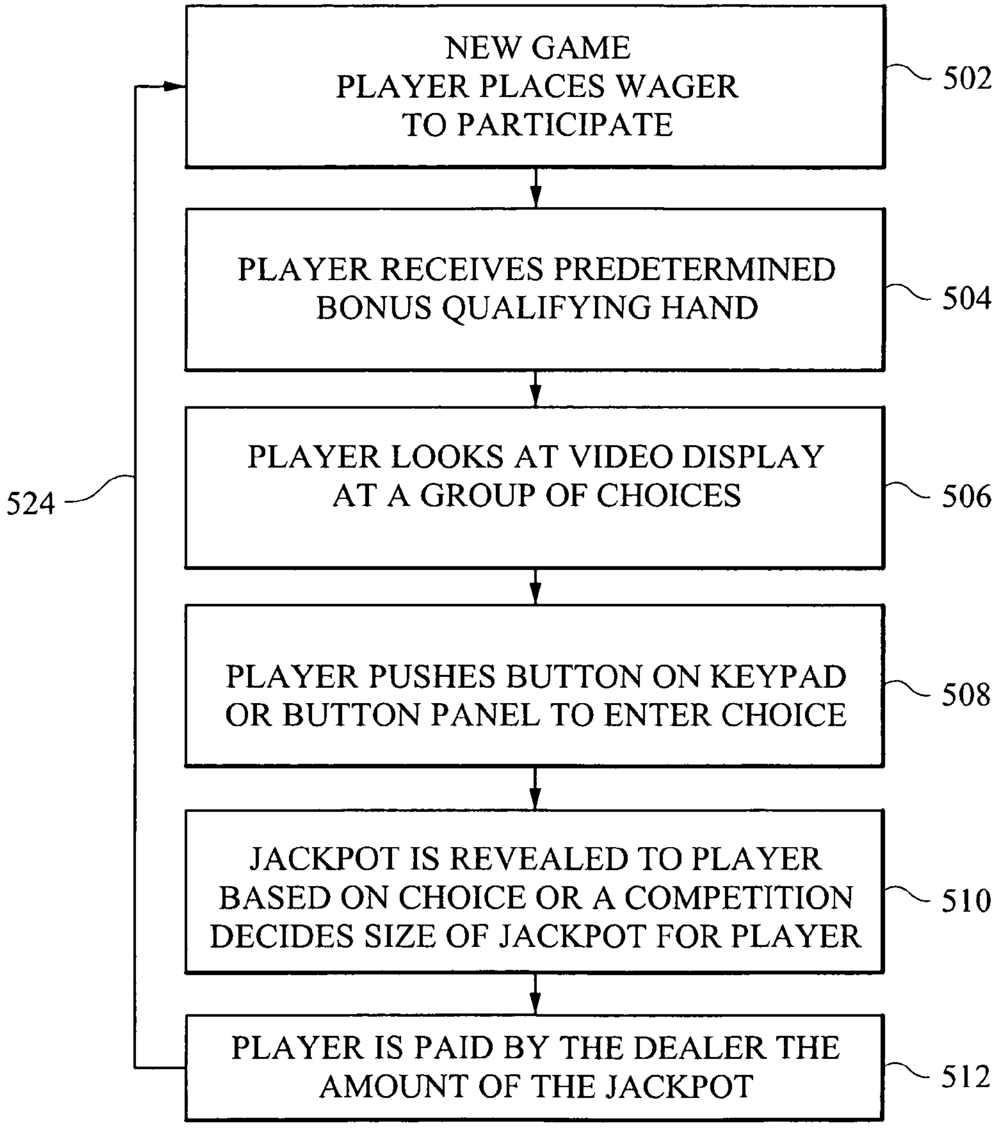
FIG. 8 is a flow chart showing one method in which a game player may interactively use the present video game system in order to procure a side wager bonus from a game dealer in connection with an underlying or primary card game of chance.

With reference now to FIG. 8, one method of using the present invention, whether stand-alone or networked, involves a game player at the gaming table placing a wager to participate in a primary table card game and a second or side wager to participate in a secondary or side game of chance 502. In this case, as an example, that side wager is a bet that the player will procure a particular set of cards or card total in the hand that is dealt to the player. If the player does not receive the particular hand, the side game is over, but if the player does receive the particular hand, the player qualifies for a bonus 504.

The dealer at the table then directs that player to look at the display screen (TDD) at the table to observe a group of characters that will participate in a video competition, or alternatively to choose among bonus option shields or boxes 506. The player then selects the number for the character, or the bonus option, that the player chooses by pressing a button on a player interactive device (PID) at the table 508. The system then runs the video competition, or exposes the bonus award chosen, in order to provide a bonus or jackpot outcome for the winning player 510.

The dealer or house then pays the player the amount of the bonus outcome or otherwise provides the player with the bonus outcome, which might include non-cash bonuses, such as products or services 512. The dealer and game players then continue with the primary card game, and the display screen may then revert to providing other video content, such as attract video, sporting or other video entertainment, advertisements, and text or images banners. Ultimately, in the method repeats in tile underlying or next primary table game 524.

Figure 9:
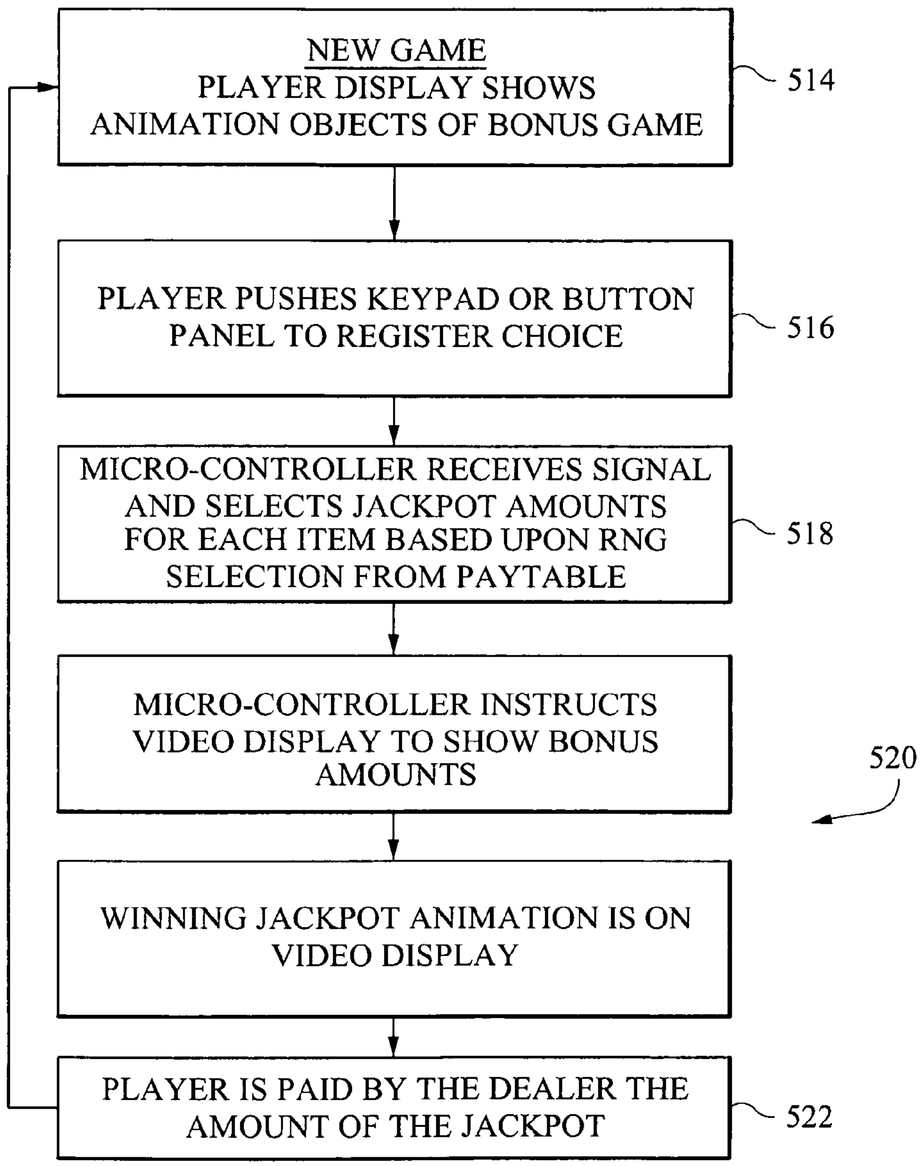
FIG. 9 is a flow chart showing the procedure interactively implemented with the present video game system in order to display and provide to the player the bonus awarded by the procedure of FIG. 8.

With reference now to FIG. 9, the video game system operates as follows during the example gaming method of FIG. 8. When the dealer activates a bonus game at the TID, the display screen (TDD) displays video animation of objects in the bonus game 514. Next, when the player presses a keypad or button on the PID, the table display system (TDS) microcontroller or associated computing components register the choice 516. The microcontroller then runs a video game, and/or selects a jackpot award, based upon a random number generator (RNG) and selection from a resulting pay table 518. The microcontroller or associated components then instruct the TDD to display the video game and/or jackpot award 520, and based on this display, the dealer or house then provide the player with the jackpot award 522.

Turning now to FIG. 10, a more particular example of a side wager game that may take place with the present systems is called "Follow the Queen." In this game, the primary table game is blackjack. The players at the game table place their regular wagers in the underlying or primary blackjack table game 530. Before the primary game commences, the player is then given the option to place a side wager, betting that the player will draw a queen of any suit in the first two cards dealt to the player in the primary game 532. If the player does not draw a queen in the first two cards, the side wager game is terminated and the primary game continues to termination and repetition of the game process 542; but if the player draws the queen in the first two cards, the player qualifies for a bonus award at the conclusion of the primary blackjack game 534. At that time, three cards are displayed (face down) and shuffled on the video display at the game table, and the player is asked to pick a card, seeking a queen and a resulting larger bonus award or jackpot 536. The player then presses a button on the PID at the game table, and the display reveals the selected card face. If it is a queen, the player is awarded a larger jackpot than if, in the alternative, the card is not a queen and the player is awarded a smaller jackpot. 538. The process then repeats in conjunction with another primary blackjack game 540.

It can thus be seen that the preferred embodiments provide systems that can, at the election of the gaming establishment (system manager, dealer, etc.), provide additional and dynamically alterable and selectable entertainment, additional gaming opportunities, and/or information to game players playing table games. Many game players are therefore more likely to play longer or return to the gaming establishment for additional, more varied, and more entertaining game experience such as that provided by the preferred embodiments.

The preferred embodiments also can provide gaming establishment and others with additional methods and systems for delivering advertisements or promotional information. The advertisements or promotions may be those provided by the gaming establishment or by third parties (possibly for a fee or other remuneration, such as reduced cost of video content or barter service). The advertisements and promotions can thus provide the gaming establishment with additional revenue opportunities by charging third parties for providing advertising or promotional information to gaming establishment customers, employees, and other visitors with the present systems.

Using the preferred embodiments, the gaming establishment can increase player interest and excitement by providing a variety of other side wager or secondary games that can offered or alternated at a given game table or game table network. Other examples of such side wager or secondary games include the Wheel of Madness game, which involves a player placing a side wager on the occurrence of a particular card combination in the primary table game. Upon the occurrence of that combination, the player is given the opportunity to participate in a spinning wheel video game. When the wheel stops rotating, the player is provided the indicated bonus award. The video display associated with and viewable to game players at the game table may then display different content such as attract mode content, bonus paid banners, advertising, or entertainment or informational content.

Another example game is called "Scratch Off." In this example, rather than providing a spinning wheel on the video display screen, the system provides a series of cards that have sections that may be cleared or appear to be 'scratched off' in order to reveal an underlying bonus award. The game player selects one the series of cards to have that card "scratched off" on the video display screen, revealing the bonus award to the player.

It is to be understood that the foregoing is a detailed description of the preferred embodiments. Numerous changes may be made to the above embodiments while remaining with the scope of the present invention. The scope of the present invention is therefore to be determined by the following claims.

What is claimed is:

1. A table game system, comprising:

(A) a gaming table having a plurality of player positions configured to provide a surface for players to place wagers and play a table game;

(B) a table display device positioned to be viewed by players playing at the gaming table and configured to present information to players;

(C) a controller in communication with the table display device;

(D) a video source, the video source configured to provide video information for a plurality of presentations;

(E) a tuner in communication with the video source and the controller, the tuner configured to receive video information and transmit selected video information to the controller;

(F) a table management system computer in communication with the controller, the table management system computer configured to interface with a system operator and to schedule presentations on the table display device;

(G) a table interface device configured to allow a dealer to input information and to change video information transmitted to the controller;

(H) a movably mounted player interface device having a plurality of input buttons configured to allow a player at any of the plurality of player positions at the gaming table to electronically provide a player selected input during a bonus game displayed on the table display device while playing the table game at the gaming table;

(I) a machine interface device in communication with the player interface device, the machine interface device configured to receive information input into the player interface device;

(J) a polling unit in communication with the controller, the table interface device and the machine interface device, the polling unit configured to manage and arbitrate communication between the controller, the table interface device and the machine interface device;

(K) wherein the controller is configured to receive information from the polling device, table management system and tuner and cause the table display device to display a plurality of different kinds of presentations, the presentations comprising:

(a) an entertainment presentation intended to entertain players playing at the gaming table; and (b) a bonus game presentation configured to present information related to a bonus game; and (L) wherein a dealer may cause the table display device to display the bonus game presentation by inputting information into the table interface device, the table interface device transmitting information to the polling unit which in turn transmits information to the controller, the controller then causing the table display device to display the information related to a bonus game.

2. The table game system of claim 1 wherein the presentations further comprise an advertisement presentation.

3. The table game system of claim 1 wherein the presentation further comprises a banner presentation.

4. The table game system of claim 3 wherein the banner presentation comprises scrolling text.

5. The table game system of claim 3 wherein the banner presentation comprises a bitmap image.

6. The table game system of claim 1 wherein a player may make a selection related to the play of a bonus game by inputting information into the player interface device.

7. The table game system of claim 1 wherein the entertainment presentation is a sporting event.

8. The table game system of claim 1 wherein the plasma controller comprises a storage device configured to store presentation information and the plasma controller is configured to retrieve presentation information from the storage device and transmit the information to the table display device.

9. The table game system of claim 8 wherein the table management system is configured to determine if the controller has a isle stored on the storage device that is to be used in a presentation.

10. The table game system of claim 9 wherein if the controller does not have the file to be used in the presentation, the table management system is configured to transmit the file to be used in the presentation to the plasma controller.

11. The table game system of claim 1 wherein the table management system is configured to receive scheduling and content information from an operator and to cause the controller to display presentations in accordance with the scheduling information and content.

12. A table game system comprising:

(A) a gaming table means for providing a place for players to place wagers and play a table game;

(B) a table display device means for presenting information to players;

(C) a controller means or controlling the display of information on the table display device;

(D) a video source means for providing a plurality of presentations;

(E) a tuner means for transmitting selected presentation information to the plasma controller;

(F) a table management system means for allowing a system operator to schedule presentations on the table display device;

(G) a table interface means for allowing a dealer to input information;

(H) a movably mounted player interface means for allowing a player to input information;

(I) a machine interface means for transmitting information input into the player interface means to the controller means;

(J) a polling means for managing and arbitrating communication between the controller, the table interface device and the machine interface device;

(K) wherein the plasma controller is configured to receive information from the polling means, table management system means and tuner means and cause the table display device to display a plurality of different kinds of presentations, the presentations comprising:

(a) an entertainment presentation intended to entertain players playing at the gaming table;

(b) a bonus game presentation configured to present information related to a bonus game;

(L) wherein a dealer may cause the table interface display means is configured to allow a dealer to display the bonus game presentation on the table display means by inputting information into the table interface means, the table interface means further configured to allow the dealer to change presentations displayed on the table display means.

13. The table game system of claim 12 wherein the presentations further comprise an advertisement presentation.

14. The table game system of claim 12 wherein the presentation further comprises a banner presentation.

15. The table game system of claim 14 wherein the banner presentation comprises ticker tape scrolling text.

16. The table game system of claim 14 wherein the banner presentation comprises a bitmap image.

17. The table game system of claim 12 wherein a player may make a selection related to the play of a bonus game by inputting information into the player interface device.

18. The table game system of claim 12 wherein the entertainment presentation is a sporting event.

19. The table game system of claim 12 wherein the controller means comprises a storage means for storing presentation information.

20. The table game system of claim 19 wherein the table management system means is configured to determine if the storage means has a file that is to be used in a presentation and if the controller means does not have the file to be used in the presentation, the table management system is configured to transmit the file to be used in the presentation to the controller means.

* * * * *